United States Patent
Aggarwal et al.

(10) Patent No.: US 12,271,456 B1
(45) Date of Patent: Apr. 8, 2025

(54) SYSTEM TO MANAGE BIOMETRIC DATA

(71) Applicant: AMAZON TECHNOLOGIES, INC., Seattle, WA (US)

(72) Inventors: Manoj Aggarwal, Seattle, WA (US); Gerard Guy Medioni, Los Angeles, CA (US); Chad Desjardins, Seattle, WA (US); Dilip Kumar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 274 days.

(21) Appl. No.: 17/808,355

(22) Filed: Jun. 23, 2022

(51) Int. Cl.
  *G06F 21/32* (2013.01)
  *G06V 10/774* (2022.01)
  *G06V 40/12* (2022.01)
  *G06V 40/50* (2022.01)

(52) U.S. Cl.
  CPC ............ *G06F 21/32* (2013.01); *G06V 10/774* (2022.01); *G06V 40/12* (2022.01); *G06V 40/1365* (2022.01); *G06V 40/50* (2022.01); *G06F 2221/2117* (2013.01)

(58) Field of Classification Search
  CPC ............ G06F 21/32; G06F 2221/2117; G06F 18/213; G06F 21/44; G06V 40/12; G06V 40/1365; G06V 40/50; G06V 10/774
  See application file for complete search history.

(56) References Cited

U.S. PATENT DOCUMENTS

| | | | | |
|---|---|---|---|---|
| 2010/0046808 | A1* | 2/2010 | Connell | H04L 9/0866 |
| | | | | 382/117 |
| 2020/0090012 | A1* | 3/2020 | Darnell | G06N 3/045 |
| 2023/0216687 | A1* | 7/2023 | Garg | G06F 21/32 |
| | | | | 713/186 |

OTHER PUBLICATIONS

Agustsson, et al., "Soft-to-Hard Vector Quantization for End-to-End Learning Compressible Representations", pp. 1-16. Retrieved from the Internet: URL: https://arxiv.org/pdf/1704.00648.pdf.

Balle, et al., "Variational Image Compression with a Scale Hyperprior", ICLR 2018, pp. 1-23. Retrieved from the Internet: URL: https://arxiv.org/pdf/1802.01436.pdf.

Bian, et al., "A Deep Image Compression Framework for Face Recognition", Jul. 4, 2019, pp. 1-10. Retrieved from the Internet: URL: https://arxiv.org/pdf/1907.01714.pdf.

(Continued)

*Primary Examiner* — Stephen G Sherman
(74) *Attorney, Agent, or Firm* — Lindauer Law, PLLC

(57) ABSTRACT

Maintaining the security of biometric data is an utmost priority. Biometric data is secured using one or more techniques. With one technique, biometric input such as images of a user's palm is used to generate first primary data (PD). The original biometric input is deleted from temporary secure storage while the first PD is securely stored. The first PD may then be processed later to determine a second PD. The first PD may then be deleted, and the second PD subsequently used. With another technique, biometric input or a PD may be processed by a first model to determine first secondary data (SD) that is representative of features of a particular user within a first embedding space. Later the PD may be processed by a second model to determine a second SD in a second embedding space. The first SD is deleted, and the second SD subsequently used.

20 Claims, 16 Drawing Sheets

(56) References Cited

OTHER PUBLICATIONS

Hu, et al., "Learning End-to-End Lossy Image Compression: A Benchmark", IEEE, pp. 1-15. Retrieved from the Internet: URL: https://arxiv.org/pdf/2002.03711v1.pdf.
Johnston, et al., "Computationally Efficient Neural Image Compression", Google Research, 9 pages. Retrieved from the Internet: URL: https://arxiv.org/pdf/1912.08771v1.pdf.
Mentzer, et al., "High-Fidelity Generative Image Compression", 34th Conference on Neural Information Processing Systems (NeurIPS 2020), pp. 1-12. Retrieved from the Internet: URL: https://proceedings.neurips.cc/paper/2020/file/8a50bae297807da9e97722a0b3fd8f27-Paper.pdf.
Minnen, et al., "Joint Autoregressive and Hierarchical Priors for Learned Image Compression", 32nd Conference on Neural Information Processing Systems (NeurIPS 2018), pp. 1-10. Retrieved from the Internet: URL: https://proceedings.neurips.cc/paper/2018/file/53edebc543333dfbf7c5933af792c9c4-Paper.pdf.
Patel, et al., "Cancelable Biometrics: A Review", Proceedings of the IEEE, May 14, 2015, 25 pages.
Rocca, et al., "Understanding Variational Autoencoders (VAEs)", Towards Data Science, Sep. 23, 2019, 34 pages. Retrieved from the Internet: URL: https://towardsdatascience.com/understanding-variational-autoencoders-vaes-f70510919f73.
Schroff, et al., "FaceNet: A Unified Embedding for Face Recognition and Clustering", CVPR 2015, pp. 815-823. Retrieved from the Internet: URL: https://openaccess.thecvf.com/content_cvpr_2015/papers/Schroff_FaceNet_A_Unified_2015_CVPR_paper.pdf.
Theis, et al., "Lossy Image Compression with Compressive Autoencoders", ICLR 2017, pp. 1-19. Retrieved from the Internet: URL: https://arxiv.org/pdf/1703.00395.pdf.
Toderici, et al., "Variable Rate Image Compression with Recurrent Neural Networks", Under review as a conference paper at ICLR 2016, pp. 1-11. Retrieved from the Internet: URL: https://arxiv.org/pdf/1511.06085v3.pdf.
Wang, et al., "Scalable Facial Image Compression with Deep Feature Reconstruction", IEEE ICIP 2019, pp. 2691-2695. Retrieved from the Internet: URL: http://www.jdl.link/doc/2011/20191223_08803255.pdf.
Wen, et al., "Variational Autoencoder Based Image Compression with Pyramidal Features and Context Entropy Model", CVPR Workshop, pp. 4321-4324. Retrieved from the Internet: URL: https://openaccess.thecvf.com/content_CVPRW_2019/papers/CLIC%202019/Wen_Variational_Autoencoder_based_Image_Compression_with_Pyramidal_Features_and_Context_CVPRW_2019_paper.pdf.
Zhou, et al., "Variational Autoencoder for Low Bit-rate Image Compression", CVPR Workshop, pp. 2617-2620. Retrieved from the Internet: URL: https://openaccess.thecvf.com/content_cvpr_2018_workshops/papers/w50/Zhou_Variational_Autoencoder_for_CVPR_2018_paper.pdf.

\* cited by examiner

SYSTEM TO MANAGE BIOMETRIC DATA

BACKGROUND

Biometric input data may be used to assert an identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
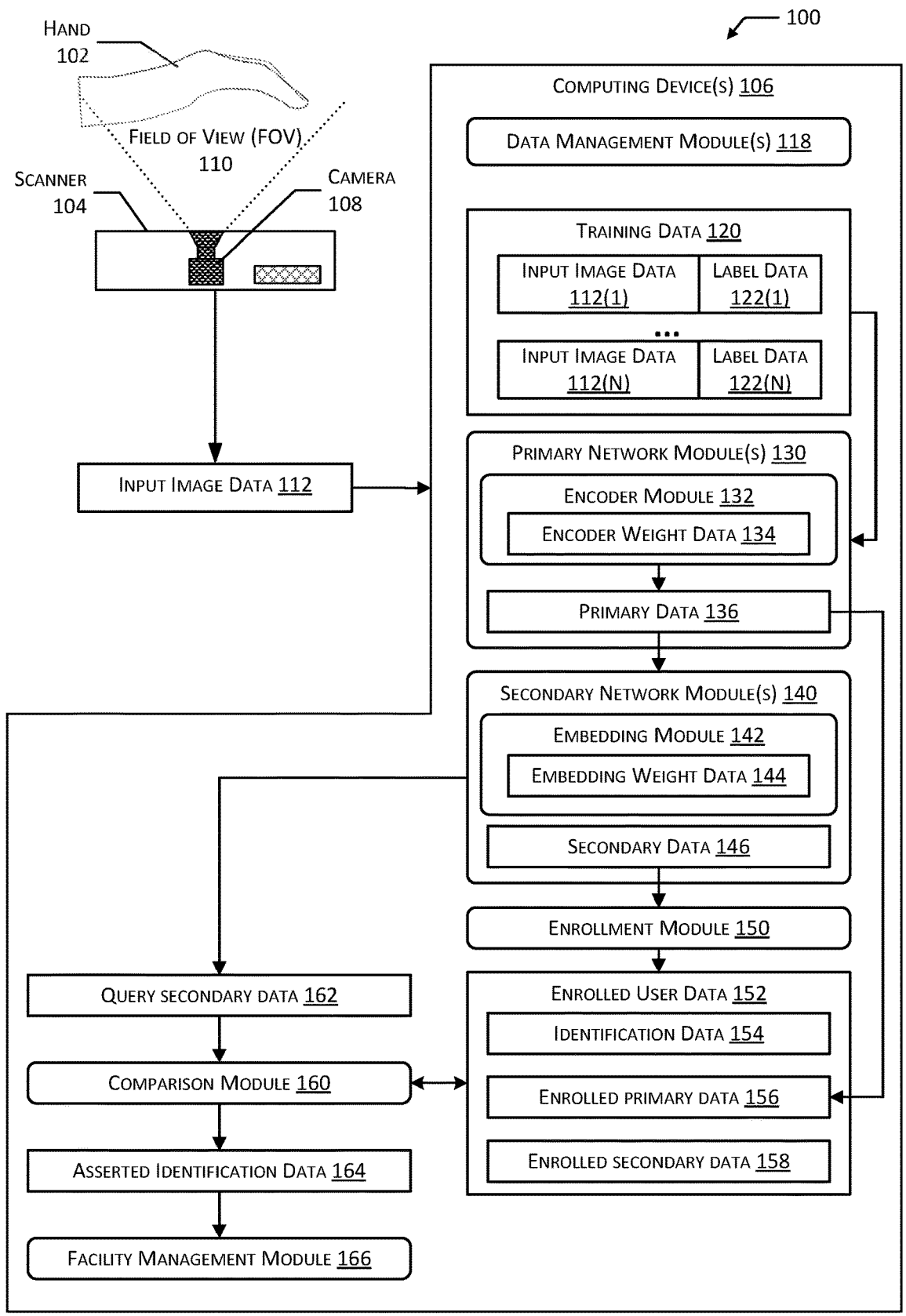
FIG. 1 illustrates a system to manage biometric data, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Input data used for biometric identification may be acquired using one or more modalities. For example, a first modality may comprise images of surface skin of a user's palm while a second modality may comprise images of subcutaneous features such as veins of the user's palm.

Traditional biometric identification systems obtain input data during enrollment and store this input data as a "gallery". This gallery facilitates further development and refinement of the traditional identification system. Development may include updates to algorithms used to characterize the input data. For example, a first neural network may be trained to process an input image and generate a first embedding that comprises a vector value in a first embedding space that is representative of the features depicted in that input image. Later, a second neural network may be trained to generate a second embedding that may be deemed advantageous to use going forward. In such systems, the input images in the gallery are processed with the second neural network to generate the second embeddings.

Because the gallery contains information that may be deemed to be private by users, legal entities, and so forth, the information therein must be safeguarded from impermissible access. As a result, substantial efforts are taken to prevent disclosure of information in the gallery, and information derived therefrom such as the embeddings.

One inadequate option is to retain only the first embeddings, and not store gallery data. However, this approach introduces several substantial drawbacks. In the situation where an update changes the embeddings, user input is required. For example, without the gallery data to generate the second embeddings each user of the system would need to perform the enrollment process again. In another situation in which there has been unauthorized access to the first embeddings of one or more users, deprecation of the first embeddings and the absence of gallery data to generate new embeddings would again result in each user having to perform the enrollment process again. Such repeated efforts may annoy users, limit improvements by substantially increasing costs associated with an update, and so forth. This may adversely affect the overall security and accuracy of such a system due to the substantial difficulty involved in making a change to the embeddings.

Described in this disclosure are techniques to manage biometric data to improve the security and resilience to deprecation of associated data. Data may be deprecated due to user request, expiration, system changes, unauthorized access, and so forth. These techniques may be used individually, or in various combinations. A first technique stores primary data based on the input data, instead of storing the input data. This eliminates the need to maintain a gallery of users, removing the opportunity for unauthorized access. A second technique allows for the translation of first primary data to second primary data without requiring re-enrollment. If first primary data is to be deprecated, a second primary data may be generated and subsequently used. A third technique allows for generation of new embeddings from primary data. If a first embedding based on primary data is deprecated, a second embedding based on the primary data may be generated for future use. A fourth technique combines these, generating second primary data and second embeddings.

Security may be further improved by storing the primary data and embeddings separately. For example, the primary data may be stored in first secure storage with a first set of access controls and the embeddings may be stored in second secure storage with a second set of access controls. Different groups of users may also utilize differently trained networks, further improving security.

By using the techniques described in this disclosure, a biometric identification system is able to manage biometric data with greater security and provide a targeted response to deprecation. This improves security as well and substantially reducing compute resources used to mitigate deprecation of particular data such as a primary data, embedding, or both.

Illustrative System

FIG. 1 illustrates a system 100 to manage biometric data, according to some implementations. The system 100 is described as being used to improve security and facilitate the management of data used as part of a biometric identification system that determines an identity of a user. However, the system and techniques described herein may be used in other situations.

A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112. The scanner 104 may include other components which are not shown. For example, the scanner 104 may include lights that illuminate the object in the FOV 110.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the scanner 104.

In one implementation, the scanner 104 is configured to acquire images of the hand 102 that are illuminated using infrared light that has two or more particular polarizations, with different illumination patterns, and so forth. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. In some implementations, images may be acquired using different combinations of polarized or unpolarized light provided by the infrared lights.

The images produced by the scanner 104 may be of first modality features, second modality features, or both. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of unpolarized light or polarized light provided by infrared lights. In one implementation, the input image data 112 comprises first modality image data and second modality image data. The first modality image data and the second modality image data of the same object may be acquired in rapid succession with respect to one another. For example, the camera 108 may operate at 60 frames per second and acquire the first modality image data in a first frame and the second modality image data in a second frame. In another implementation, the input image data 112 may comprise a single multi-modal image that includes at least some features present in both the first modality and the second modality. For example, the hand 102 may be illuminated with unpolarized or randomly polarized infrared light, and the camera 108 may include an infrared optical bandpass filter in the optical path. The resulting input image data 112 may include surface and subcutaneous features.

In the implementation depicted here, the scanner 104 does not include a guide, scan plate, or other structure that constrains the pose or position of the hand 102. The omission of the guide may improve sanitary operation of the system. For example, by removing the guide, the user's hand 102 does not come into physical contact with a structure, eliminating the possibility of contact transmission of contaminants, disease, and so forth. By removing the physical contact, the need for surface cleaning of the guide between users may be eliminated.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image.

The computing device 106 may include one or more data management modules 118. The data management modules 118 may be used to manage one or more of the generation, storage, or deprecation of biometric data. Operation of the data management modules 118 are discussed in more detail below.

Training data 120 may comprise input image data 112, such as input image data 112 acquired using one or more modalities. For example, the training data 120 may comprise first modality image data, second modality image data, multi-modal image data, and so forth. The input image data 112 in the training data 120 may be associated with label data 122. For example, the label data 122 may be indicative of modality, identity, and so forth.

The training data 120 may comprise one or more of actual input data with associated label data 122 or synthetic input data with associated label data 122. The actual input data may comprise actual input image data 112 that has been acquired from individuals who have opted in to provide training data 120. In one implementation, the training data 120 may exclude individuals who have enrolled to use of the system for identification. In another implementation, some enrolled users may opt in to explicitly permit input image data 112 obtained during enrollment to be stored as actual input data for later training.

A primary network module 130 includes an encoder module 132 that is trained using the training data 120 to determine primary data 136. The encoder module 132 may comprise a neural network or other machine learning system that, during training, determines encoder weight data 134. The encoder weight data 134 may comprise weight values, bias values, or other values associated with operation of nodes within the machine learning system of the encoder module 132. The encoder weight data 134 is retained in secure storage.

During training, a loss function is utilized to provide feedback that modifies the encoder weight data 134 responsive to the results produced during a particular training iteration. In one implementation, the primary network module 130 during training comprises a variational autoencoder backbone that is used in conjunction with an embedding model. The variational autoencoder backbone includes an encoder module to determine primary data of an input image, while a decoder module processes the primary data to reconstruct the image. The variational autoencoder backbone may implement a hyper-prior entropy model during training. The primary network module 130 uses a previously trained embedding model to provide first secondary data based on the input image and second secondary data based on the reconstructed image.

A loss function utilized during training of the encoder module 132 includes loss values: distortion loss, embedding distance loss, and in some implementations a bitrate loss. The bitrate loss considers the reduction in size of data of the primary data compared to the input image. The distortion loss considers the difference between a reconstructed image created resulting from the output of the encoder module 132 as compared to the input image. The embedding distance loss considers the distance between first secondary data based on the input image and second secondary data based on the reconstructed image. By using this loss function, the encoder module "learns", such as expressed as encoder weight data 134 of values associated with nodes or other elements within the encoder module, to develop primary data that is small in terms of data size and provides a feature-rich representation of the input image that is suitable for use by an embedding model. During later use of the system, a different embedding model other than that used during training of the encoder module 132 may be used.

Training and operation of the primary network module 130 is discussed in more detail in the following figures.

The system includes one or more secondary network modules 140 comprising one or more embedding modules 142 and associated embedding weight data 144. Once trained, an embedding module 142 accepts input image data 112 or primary data 136 as input and produces as output secondary data 146. The embedding weight data 144 is stored in secure storage. The secondary data 146 is representative of at least some of the features represented in the input. In some implementations, the secondary data 146 may comprise a vector value in an embedding space. The secondary data 146 may comprise a vector representative of 512 dimensions. In some implementations, the embedding modules 142 may be trained to determine the embedding weight data 144 using primary data 136 as input.

Users are able to utilize the system 100 by performing an enrollment process. An enrollment module 150 may coordinate the enrollment process. Enrollment may associate biometric information, such as primary data 136 and secondary data 146, with particular information such as a name, account number, and so forth.

During an enrollment process, the user opts in and presents their hand 102 to the scanner 104. The scanner 104 provides input image data 112 to a computing device 106. The computing device 106 may include one or more of the trained encoder module 132 or a trained embedding module 142. The scanner 104 may encrypt and send the input image data 112 or data based thereon such as primary data 136, secondary data 146, and so forth to another computing device 106 such as a server. Once the primary data 136 has been generated during the enrollment process, the input image data 112 may be deleted. The server may process the primary data 136 to determine the secondary data 146. As mentioned above, users who opt in to provide training data 120 may have their input image data 112 retained. The input image data 112 for users who do not opt in, or have rescinded their opt in, is deleted.

During the enrollment process, the submitted secondary data 146 may be checked to determine whether the user has been previously enrolled. A successful enrollment may comprise storage of enrolled user data 152 comprising identification data 154, such as name, telephone number, or account number, enrolled primary data 156, enrolled secondary data 158, and so forth. The identification data 154 may be associated with one or more of the enrolled primary data 156 or the enrolled secondary data 158 as enrolled user data 152. In some implementations, the enrolled user data 152 may comprise additional information associated with processing of the input image data 112 with an embedding module 142. For example, the enrolled user data 152 may comprise intermediate layer data, such as the values of a penultimate layer of the embedding module 142.

During subsequent usage, such as at a second time, the (as yet unidentified) user presents their hand 102 at a scanner 104. The resulting query input image data 112 may be processed by the trained encoder module 132 to determine query primary data. The query primary data may then be processed by the secondary network modules 140 to determine query secondary data 162.

A comparison module 160 compares the query secondary data 162 to the first secondary data 146 stored in the enrolled user data 152 to determine asserted identification data 164. In one implementation, the asserted identification data 164 may comprise a user identifier associated with the closest previously stored secondary data 146 in the enrolled user data 152 to the query secondary data 162 associated with the user who presented their hand 102. The comparison module 160 may utilize other considerations, such as requiring that the query secondary data 162 is no more than a maximum distance in the embedding space from the secondary data 146 of a particular user before determining the asserted identification data 164.

The asserted identification data 164 may then be used by subsequent systems or modules. For example, the asserted identification data 164, or information based thereon, may be provided to a facility management module 166.

The facility management module 166 may use the asserted identification data 164 to associate an identity with that user as they move about the facility. For example, the facility management module 166 may use data from cameras or other sensors in the environment to determine a location of the user. Given a known path of the user from an entrance that utilizes the scanner 104, the user identity indicated in the identification data 154 may be associated with the user as they use the facility. For example, the now identified user may walk to a shelf, remove an item, and leave the facility. The facility management module 166 may determine the interaction data indicative of the removal of the item as being associated with the user identifier specified in the asserted identification data 164, and bill an account associated with the user identifier. In another implementation, the facility management module 166 may comprise a point of sale system. The user may present their hand 102 at checkout to assert their identity and pay using a payment account that is associated with their identity.

During operation of the system 100 data involved in operation may be deprecated. The data management modules 118 may manage one or more of the generation, storage, or deprecation of biometric data. The biometric data managed may include one or more of the primary data 136, secondary data 146, the enrolled primary data 156, enrolled secondary data 158, data based on or derived from the input image data 112, and so forth. Data may be deprecated due to one or more events or circumstances. For example, data may be deprecated due to user request, expiration, system changes, unauthorized access, and so forth. Continuing the example, a user or administrator may wish to deprecate, "cancel", or revoke stored biometric data such as enrolled primary data 156 or enrolled secondary data 158. Revocation may be performed on individual instances or entries of enrolled user data 152, or on an entire data store of enrolled user data 152 for a plurality of users. The data management modules 118 may determine a condition exists to perform a deprecation, receive a message or command indicative of a deprecation, and so forth. The data management modules 118 may then coordinate the operation of the system 100 to perform the deprecation. For example, the data management modules 118 may provide instructions to train or operate the primary network modules 130, secondary network modules 140, and so forth. The data management modules 118 may coordinate the deprecation such that the system 100 remains in operation during and after the deprecation.

The primary network modules 130 and the secondary network modules 140 may utilize one or more machine learning techniques during training. These training techniques introduce variation in the training process and in the resulting weight data that represents the results of the training, such as the encoder weight data 134 and embedding weight data 144. This variation occurs even if the training data 120 is the same or similar. This variation may be used to improve the security of the system 100 and manage the biometric data.

As mentioned above, the enrolled user data 152 does not include the input image data 112. As the input image data 112 is not retained by the system 100, unauthorized access to this data is extremely difficult or impossible depending upon configuration. For example, if the scanner 104 processes the input image data 112 locally using a trained secondary network module 140 and sends only the enrolled primary data 156, the input image data 112 is never stored on the computing device 106 and so it not available for compromise.

The enrolled primary data 156 is retained in secure storage. The primary data 136 is determined by using a trained primary network module 130 and associated encoder weight data 134. Due to the variability mentioned above, each time the process to train a primary network module 130 is performed, the encoder weight data 134 resulting from different trainings will differ.

If primary data is to be deprecated, a translator module may be trained to translate the primary data 136 from first primary data to second primary data. This allows for the system 100 to deprecate and replace enrolled primary data 156 without having to re-enroll users. For example, first enrolled primary data 156(1) is provided as input to the trained translator module that provides as output second enrolled primary data 156(2). The translator module and its training are discussed in more detail with regard to FIGS. 7 and 8.

A change in the primary data 136 may result in a change in the secondary data 146. The secondary network modules 140 are trained using primary data 136. A change in the input to the secondary network module 140, such as a change in the primary data 136, may require re-training or training of a new secondary network module 140. For example, deprecation of first enrolled primary data 156(1) may result in deprecation of the first primary network module 130(1) used to generate the first primary data 136(1) and deprecation of the first secondary network module 140(1) trained using the first primary data 136(1). Continuing the example, a second primary network module 130(2) and a second secondary network module 140(2) may be trained. This is discussed in more detail with regard to FIGS. 9 and 10.

In situations in which the secondary data 146 is deprecated, the previously stored primary data 136 may be used to determine new secondary data 146. For example, a second secondary network module 140(2) may be trained using first primary data 136 to determine second secondary data 146. As mentioned, the variability associated with training will result in second embedding weight data 144 that differs from previous embedding weight data 144. Once trained, the first enrolled primary data 156(1) is processed using the second secondary network module 140(2) and the second embedding weight data 144(2) to determine second enrolled secondary data 158(2). As a result, if the first enrolled secondary data 158(1) is deprecated, there is no need for users to re-enroll to generate second enrolled secondary data 158(2). This is discussed in more detail with regard to FIGS. 11-12.

By using the system and techniques described in this disclosure, biometric data is able to be effectively and securely managed while improving operational efficiency and improving security. This improves overall privacy for the user while also allowing biometric data to be deprecated without requiring re-enrollment.

The systems and techniques described above are discussed with respect to images of human hands. These systems and techniques may be used with respect to other forms of data, other kinds of objects, and so forth. For example, these techniques may be used for facial recognition systems, object recognition systems, and so forth.

Figure 2A:
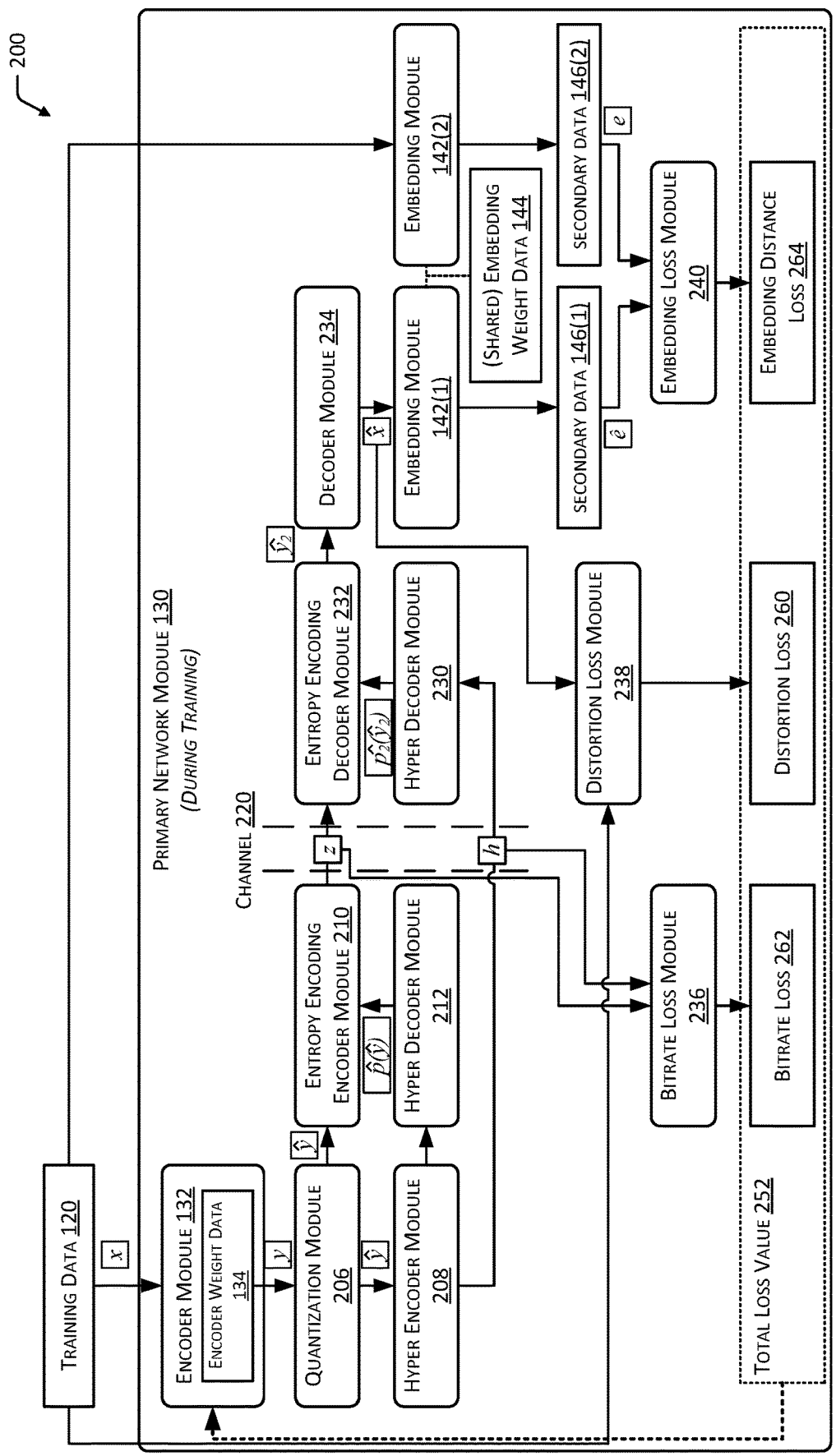
FIG. 2A illustrates training of a primary network module having an encoder module to determine encoder weight data, according to some implementations.

FIG. 2A illustrates at 200 training the primary network module 130 having an encoder module 132 to determine encoder weight data 134, according to some implementations. Once trained, the primary network module 130 may accept input image data 112 as input and provide as output the primary data 136.

The primary network module 130 may comprise the encoder module 132, a quantization module 206, a hyper encoder module 208, an entropy encoding encoder module 210, and a hyper decoder module 212. During training as shown here, the primary network module 130 may also comprise a hyper decoder module 230, an entropy encoding decoder module 232, a decoder module 234, a bitrate loss module 236, a distortion loss module 238, one or more embedding modules 142 utilizing shared embedding weight data 144, and an embedding loss module 240. In some implementations (not shown), the primary network module 130 may include one or more modules to provide functions such as cropping, alignment, sizing, and so forth of the input to the primary network module 130. For example, a module may resize, crop, and align images to a canonical pose of a hand prior to processing by the embedding modules 142.

In the implementation depicted here, the primary network module 130 comprises some elements of an autoencoder architecture with scale hyperprior as an entropy model. (See Ballé, Johannes, et al. "Variational image compression with a scale hyperprior." International Conference on Learning Representations (2018).) The hyperprior arrangement uses a hyperprior encoder-decoder model to predict prior distribution of latent representation based on the context.

The training data 120 comprises one or more input image data 112, an image being designated in the following discussion as "x". The encoder module 132 comprises a machine learning system that is trained, using a total loss value 252 discussed below to modify the encoder weight data 134 associated with operation of the encoder module 132. A first image "x" of the training data 120 is provided as input to the encoder module 132. The output from the encoder module 132 comprises a first latent representation designated in the following discussion as "y".

The first latent representation y is then processed by the quantization module 206. The quantization module 206 provides as output a first quantized latent representation designated $\hat{y}$ ("y hat"). The first quantized latent representation $\hat{y}$ is provided as input to two modules: the hyper encoder module 208 and the entropy encoding encoder module 210. In some implementations, the quantization may utilize a rounding function. (See Mentzer, Fabian, et al. "High-Fidelity Generative Image Compression." Advances in Neural Information Processing Systems 33 (2020).)

The first quantized latent representation $\hat{y}$ is then processed by the hyper encoder module 208. The hyper encoder module 208 provides as output first channel data "h" comprising transferred hyper bytes. The first channel data h is provided as input to two modules: the hyper decoder module 212 and the hyper decoder module 230. (See Ballé, Johannes, et al. "Variational image compression with a scale hyperprior." International Conference on Learning Representations (2018).)

The first channel data h is then processed by the hyper decoder module 212. The hyper decoder module 212 provides as output a first predicted distribution "$\hat{p}$ ($\hat{y}$)". The first predicted distribution $\hat{p}$ ($\hat{y}$) is provided as input to the entropy encoding encoder module 210.

During training, the first channel data h is also processed by the hyper decoder module 230. The hyper decoder module 230 provides as output a second predicted distribution "$\hat{p}_2(\hat{y}_2)$". The second predicted distribution $\hat{p}_2$ ($\hat{y}_2$) is provided as input to the entropy encoding decoder module 232. In some implementations, a single hyper decoder module 212 may be used, and the resulting first predicted distribution, $\hat{p}$ ($\hat{y}$) may be used by subsequent modules.

The entropy encoding encoder module 210 accepts as input the first quantized latent representation designated $\hat{y}$ and the first predicted distribution $\hat{p}$ ($\hat{y}$). The entropy encoding encoder module 210 provides as output second channel data "z". Once the primary network module 130 has been trained, the primary data 136 may comprise or be based on one or more of the second channel data z, the first quantized latent representation designated $\hat{y}$, or the latent representation y. The latent representation y may contain the most information about the input image. The first quantized latent representation designated $\hat{y}$ and second channel data z may be deemed to have the same or approximately the same amount of information about the input image. These implementations are discussed with respect to FIGS. 2B-2D.

In this illustration, the channel 220 is representative of the transfer of data from an encoder portion of the primary network module 130 to a decoder portion. Once training is complete, the information associated with the decoder portion may be discarded. The discard of this information results in the reconstruction of the original input image from the primary data 136 being infeasible.

During training, the entropy encoding decoder module 232 accepts as input the second channel data z and the second predicted distribution $\hat{p}_2(\hat{y}_2)$. The entropy encoding decoder module 232 provides as output a second quantized latent representation $\hat{y}_2$.

During training, the decoder module 234 accepts as input the second quantized latent representation $\hat{y}_2$. The decoder module 234 provides as output a reconstructed image "$\hat{x}$" (x hat).

A first embedding module 142(1) accepts as input the reconstructed image $\hat{x}$. The first embedding module 142(1) uses (shared) embedding weight data 144 and provides as output first secondary data 146(1) "$\hat{e}$". The first embedding module 142(1) has been previously trained to determine the first secondary data 146(1).

The embedding module 142 used during training of the primary network module 130 may comprise a single embedding model, a plurality or ensemble of multiple embedding models, a decorrelated embedding model associated with multiple modalities, and so forth. In some implementations, compared to an embedding module 142 used to produce the query secondary data 162, the embedding module 142 used during training of the primary network module 130 may have greater complexity, may produce secondary data 146 with greater dimensionality, and so forth. For example, the embedding module 142 used during training of the primary network module 130 may comprise an ensemble of many embedding models from which their respective output is aggregated to produce secondary data 146.

A second embedding module 142(2) accepts as input the input image x. The second embedding module 142(2) uses the (shared) embedding weight data 144 and provides as output second secondary data 146(2) "e". The second embedding module 142(2) has been previously trained to determine the second secondary data 146(2). In some implementations, a single embedding module 142 may be operated twice during a training iteration, to produce the first secondary data 146(1) and then the second secondary data 146(2).

The bitrate loss module 236 accepts as input the first channel data h and the second channel data z and determines a bitrate loss 262. In one implementation, the bitrate loss module 236 may determine the bitrate loss ($L_r$) as:

$$L_r = BPP(z) + BPP(h) \quad \text{(Equation 1)}$$

where BPP(z) is the bits per pixel of the second channel data z, and
BPP(h) is the bits per pixel of the first channel data h.
In one implementation, the BPP may be determined as:

$$BPP = \frac{\text{file\_size} * 8 * 1024}{\text{num\_pixel}} \quad \text{(Equation 2)}$$

where file_size is the size in bytes of the input and num_pixel is the total number of pixels in the input.

In other implementations, other functions may be used to determine the bitrate loss 262. The bitrate loss module 236 and use of the bitrate loss 262 as part of the total loss value 252 allows the encoder module 132 to be trained to minimize the size of the primary data 136 while taking into consideration the other loss factors such as distortion and embedding distance.

In some implementations, the bitrate loss module 236 and the bitrate loss 262 may be omitted from the primary network module 130 and the determination of the total loss value 252.

The distortion loss module 238 accepts as input the input image x and the reconstructed image $\hat{x}$ and determines a distortion loss 260. In one implementation, the distortion loss 260 ($L_d$) may be determined as:

$$L_d = MSE(\hat{x}, x) \quad \text{(Equation 3)}$$

where MSE is a mean-square error function.
In another implementation the distortion loss 260 may be determined as:

$$L_d = MS\_SSIM(\hat{x}, x) \quad \text{(Equation 4)}$$

where MS_SSIM is a multi-scale structural similarity index measure function.
For example, MS_SSIM may be determined as:

$$SSIM(x, y) = \frac{(2\mu_x \mu_y + c_1)(2\sigma_{xy} + c_2)}{(\mu_x^2 + \mu_y^2 + c_1)(\sigma_x^2 + \sigma_y^2 + c_2)} \quad \text{(Equation 5)}$$

where $\mu_x$, $\mu_y$, $\sigma_x$, $\sigma_y$, $\sigma_{xy}$ are the mean value of x, the mean value of y, the standard deviation of x, the standard deviation of y, and the covariance between x and y, respectively. $c_1$, $c_2$ are small constants.

The SSIM is calculated for each pixel using the mean value and standard deviation in sliding windows. MS_SSIM is a multi-scale version of SSIM.

In other implementations, other functions may be used to determine the distortion loss 260. The distortion loss module 238 and the use of the distortion loss 260 as part of the total loss value 252 allows the encoder module 132 to be trained to minimize the distortion introduced by the encoder, while taking into consideration the other loss factors such as the bitrate and embedding distance.

The embedding loss module 240 accepts as input the first secondary data 146(1) e and the second secondary data 146(2) e and determines an embedding distance loss 264. In one implementation, the embedding distance loss 264 ($L_e$) may be determined as:

$$L_e = \text{cosine\_distance}(\hat{e}, e) \quad \text{(Equation 6)}$$

In other implementations, other functions may be used to determine the embedding distance loss 264. The embedding loss module 240 and the use of the embedding distance loss 264 as part of the total loss value 252 allows the encoder module 132 to be trained to minimize the differences in secondary data 146 that are introduced by the encoder, while taking into consideration the other loss factors such as the bitrate and distortion.

While the embedding distance loss 264 is based on the secondary data 146 obtained from an embedding module 142, subsequent changes to the embedding module(s) 142 used by the system 100 are independent of this. For example, an initial embedding module 142 may be used to determine the secondary data 146 used for training the primary network module 130. At a later time, an embedding module 142(219) may be trained using the primary data 136 to determine secondary data 146(219). The initial embedding module 142 and the later embedding module 142(219) may differ in operation, architecture, complexity, dimensionality, and so forth. However, the inclusion of the embedding distance loss 264 in the training of the primary network module 130 allows for learning to provide output that preserves at least some of the information that is subsequently used by embedding modules 142.

A total loss value 252 is determined based on the bitrate loss 262, the distortion loss 260, and the embedding distance loss 264. The total loss value 252 may be provided to the encoder module 132 to train the encoder portion of the primary network module 130. For example, the total loss value 252 may modify one or more values of the encoder weight data 134.

The total loss function used to determine the total loss value 252 (L) implemented as described before may be expressed as:

$$L = \gamma_d L_d + \gamma_r L_r + \gamma_e L_e \quad \text{(Equation 7)}$$

where $\gamma_d$, $\gamma_r$, $\gamma_e$ are constants that may be used to vary the weighting accorded to a particular element.

While the training of the primary network module 130 is described with respect to image data, in other implementations other data may be provided as input. For example, audio data comprising data representative of human speech may be used as input. The primary network module 130 may be trained to provide primary data 136 representative of that audio data. For example, the system 100 may be used to determine identity based at least in part on the user's voice.

In other implementations, the primary network module 130 may utilize other architectures or techniques to determine the primary data 136. For example, the primary network module 130 may utilize one or more data compression algorithms, hash functions, encryption algorithms, and so forth. In some implementations, the primary data 136 may comprise data produced by one or more intermediate layers of a neural network. In some implementations, the primary data 136 may comprise data produced by one or more intermediate layers of an embedding module 142.

Figure 2B:
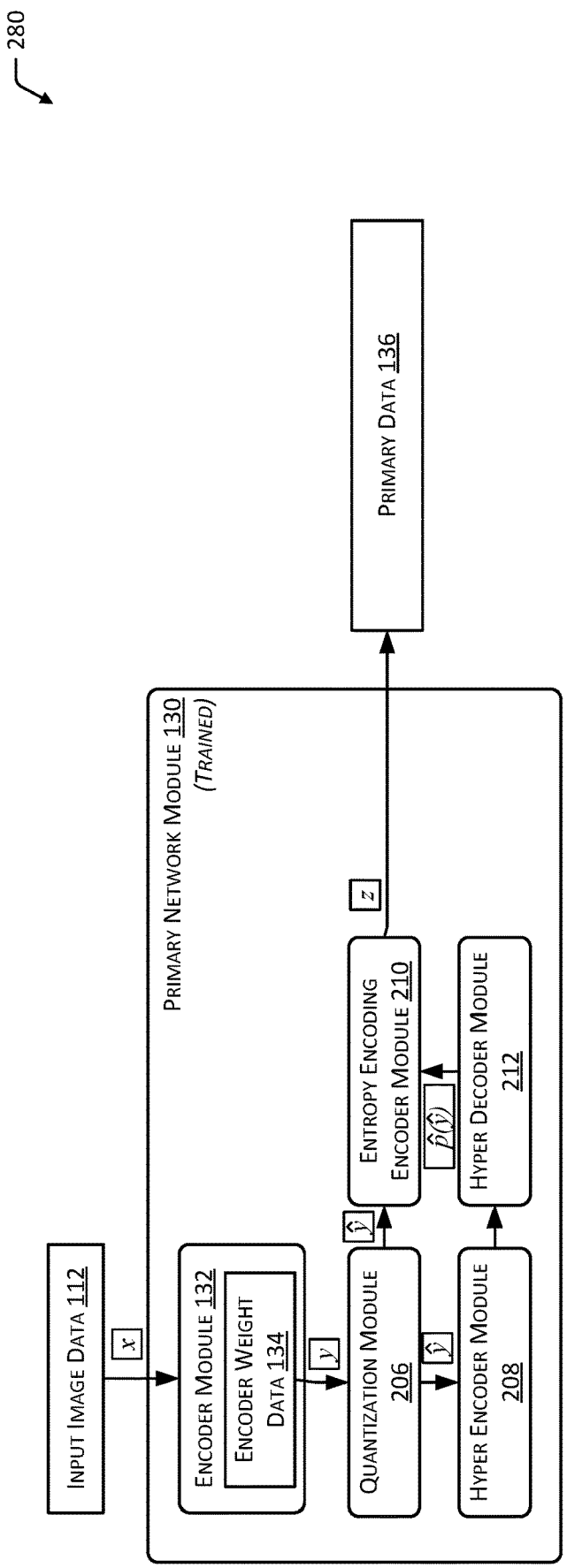
FIG. 2B illustrates use of a trained primary network module that uses channel data as the primary data, according to some implementations.

FIG. 2B illustrates at 280 a trained primary network module 130 that utilizes the second channel data z as the primary data 136, according to some implementations. Once training is complete, the decoder portion of the system may be disregarded. For example, the decoder module 234 and related weight data may be deleted.

The primary network module 130 once training is complete may comprise the encoder module 132, the encoder weight data 134, the quantization module 206, the hyper encoder module 208, the entropy encoding encoder module 210, and the hyper decoder module 212. Input image data 112 is processed by the trained primary network module 130 and primary data 136 comprising the second channel data z is provided as output.

The second channel data z provides primary data that is a representation of the input image data 112, that is smaller in data size compared to other representations such as the first quantized latent representation $\hat{y}$, or the latent representation y. In some implementations, use of the second channel data z as the primary data 136 may be chosen to minimize size of the data that is then provided to a subsequent embedding module 142, to minimize the size of data stored within the enrolled user data 152, and so forth.

The second channel data z is within an entropy-encoding bitstream domain, and not within the image matrix domain of the input image data 112. As a result, an embedding module 142 or other subsequent system utilizing such primary data 136 are designed accordingly.

Figure 2C:
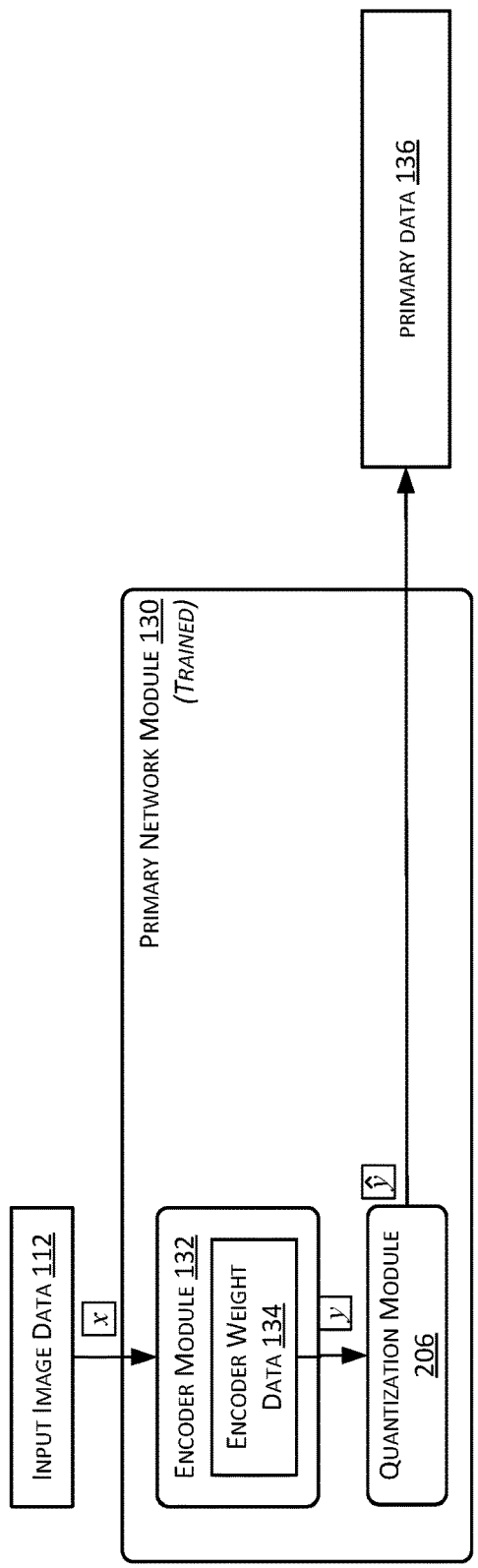
FIG. 2C illustrates use of a trained primary network module that uses a quantized latent representation as the primary data, according to some implementations.

FIG. 2C illustrates at 282 a trained primary network module 130 that utilizes the quantized latent representation $\hat{y}$ as the primary data 136, according to some implementations. Once training is complete, the decoder portion and entropy portions of the system may be disregarded. For example, the decoder module 234 and related weight data may be deleted.

The primary network module 130 once training is complete may comprise the encoder module 132, the encoder weight data 134, and the quantization module 206. Input image data 112 is processed by the trained primary network module 130 and the primary data 136 comprising the first quantized latent representation $\hat{y}$ is provided as output.

The first quantized latent representation $\hat{y}$ provides primary data of the input image data 112 that is within the image matrix domain. As a result, such primary data 136 may be readily used with existing embedding modules 142 or other systems. For example, the primary data 136 comprising the first quantized latent representation $\hat{y}$ may be used to train an embedding module 142. Because of the reduced size, compared to the input image x and the characteristics associated with the first quantized latent representation $\hat{y}$, such training may require less memory, be computationally more efficient, complete more quickly, and so forth.

With regard to size, the first quantized latent representation $\hat{y}$ may be larger than the second channel data z and smaller than the latent representation y. In some implementations, the latent representation y may be smaller than the input image x.

Figure 2D:
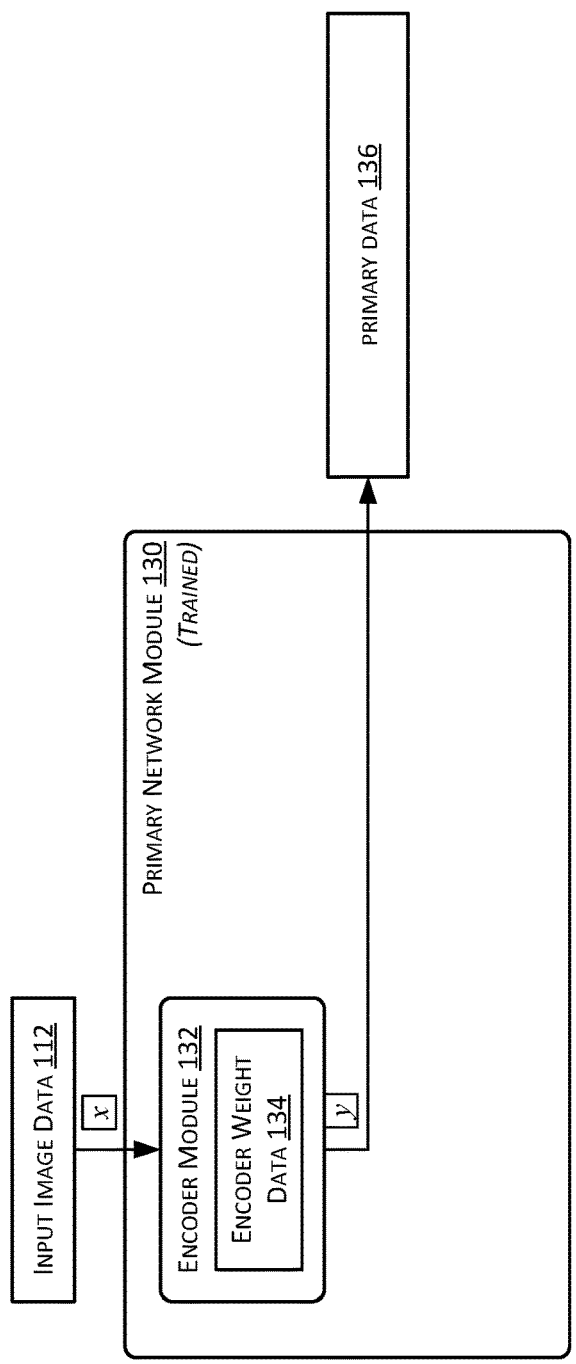
FIG. 2D illustrates use of a trained primary network module that uses a latent representation as the primary data, according to some implementations.

FIG. 2D illustrates at 284 a trained primary network module 130 that utilizes the latent representation y as the primary data 136, according to some implementations. Once training is complete, the decoder portion and entropy portions of the system may be disregarded. For example, the decoder module 234 and related weight data may be deleted.

The primary network module 130 once training is complete may comprise the encoder module 132 and the associated encoder weight data 134. Input image data 112 is processed by the trained primary network module 130 and the primary data 136 comprising the latent representation y is provided as output.

The latent representation y provides primary data of the input image data 112 that is within the image matrix domain. As a result, such primary data 136 may be readily used with existing embedding modules 142 or other systems. For example, the primary data 136 comprising the latent representation y may be used to train an embedding module 142. Because of the reduced size, compared to the input image x and the characteristics associated with the latent representation y, such training may require less memory, be computationally more efficient, complete more quickly, and so forth. With regard to size, the latent representation y may be smaller than the input image x.

Figure 3A:
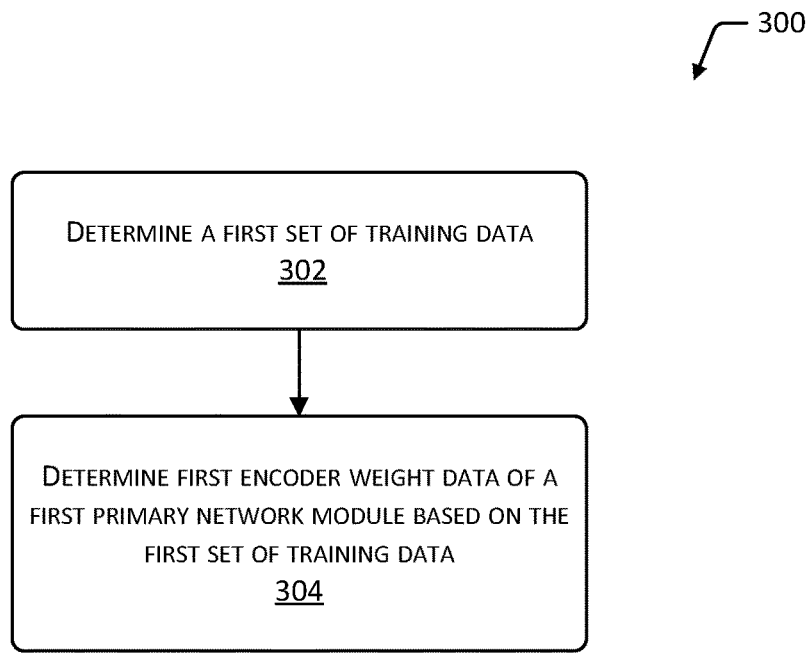
FIG. 3A illustrates a flow diagram of a process to train a primary network module to determine primary data, according to some implementations.
Figure 3B:
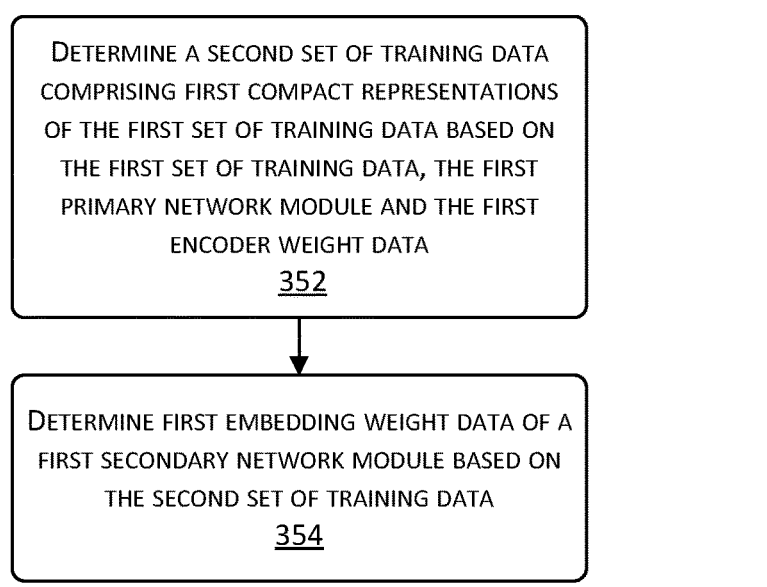
FIG. 3B illustrates a flow diagram of a process to train a secondary network module to determine secondary data using primary data, according to some implementations.

FIGS. 3A and 3B illustrate training of various portions of the system 100, according to some implementations.

The processes described in this disclosure, including those in the following figures, may be performed any number of times, and the labels used herein such as "first" are included for ease of discussion and not as a limitation. For example, after a first primary network module 130(1) has been trained to determine first encoder weight data 134(1) the process may be performed again to train and determine second encoder weight data 134(2) associated with a second primary network module 130(2).

The processes described in this disclosure also reference different primary network modules 130 with associated encoder weight data 134 and embedding modules 142 with associated embedding weight data 144. In some implementations, modules with the same architecture may be used with different weights to provide a different module. For example, a first primary network module 130(1) may consist of the specific pairing of a primary network module 130 and first encoder weight data 134(1), while a second primary network module 130(2) consists of the same primary network module 130 but used with second encoder weight data 134(2). A similar variation is possible with the secondary network modules 140. Notwithstanding this, in some implementations the architecture or operation of modules may differ. For example, the first primary network module 130(1) may have a first network architecture while the second primary network module 130(2) has a second network architecture different from the first.

FIG. 3A illustrates a flow diagram 300 of a process to train a primary network module 130 to determine primary data 136, according to some implementations. In some implementations the process may be executed at least in part by one or more computing devices 106.

At 302 a first set of training data 120 is determined. For example, training data 120 may be acquired that comprises input image data 112 that is stored in the secure storage 404.

At 304 first encoder weight data 134(1) of a first primary network module 130(1), or a first encoder module 132(1) that is a part thereof, is determined based on training using the first set of training data 120. The training of the first primary network module 130(1) results in the determination of the first encoder weight data 134(1).

FIG. 3B illustrates a flow diagram 350 of a process to train a secondary network module 140 to determine secondary data 146 using primary data 136, according to some implementations. In some implementations the process may be executed at least in part by one or more computing devices 106.

At 352 a second set of training data 120 comprising first primary data of the first set of training data 120 is determined. The first primary data may be determined based on processing the first set of training data 120 with the first primary network module 130(1) using the first encoder weight data 134(1). For example, individual input image data 112 in the training data 120 may be processed using the first primary network module 130(1) to determine first training primary data 136(1).

At 354 first secondary data 146(1) of a first embedding module 142(1) is determined based on training using the second set of training data 120. For example, the first embedding module 142(1) is trained to determine first secondary data 146(1) using the set of first training primary data 136(1).

Figure 4:
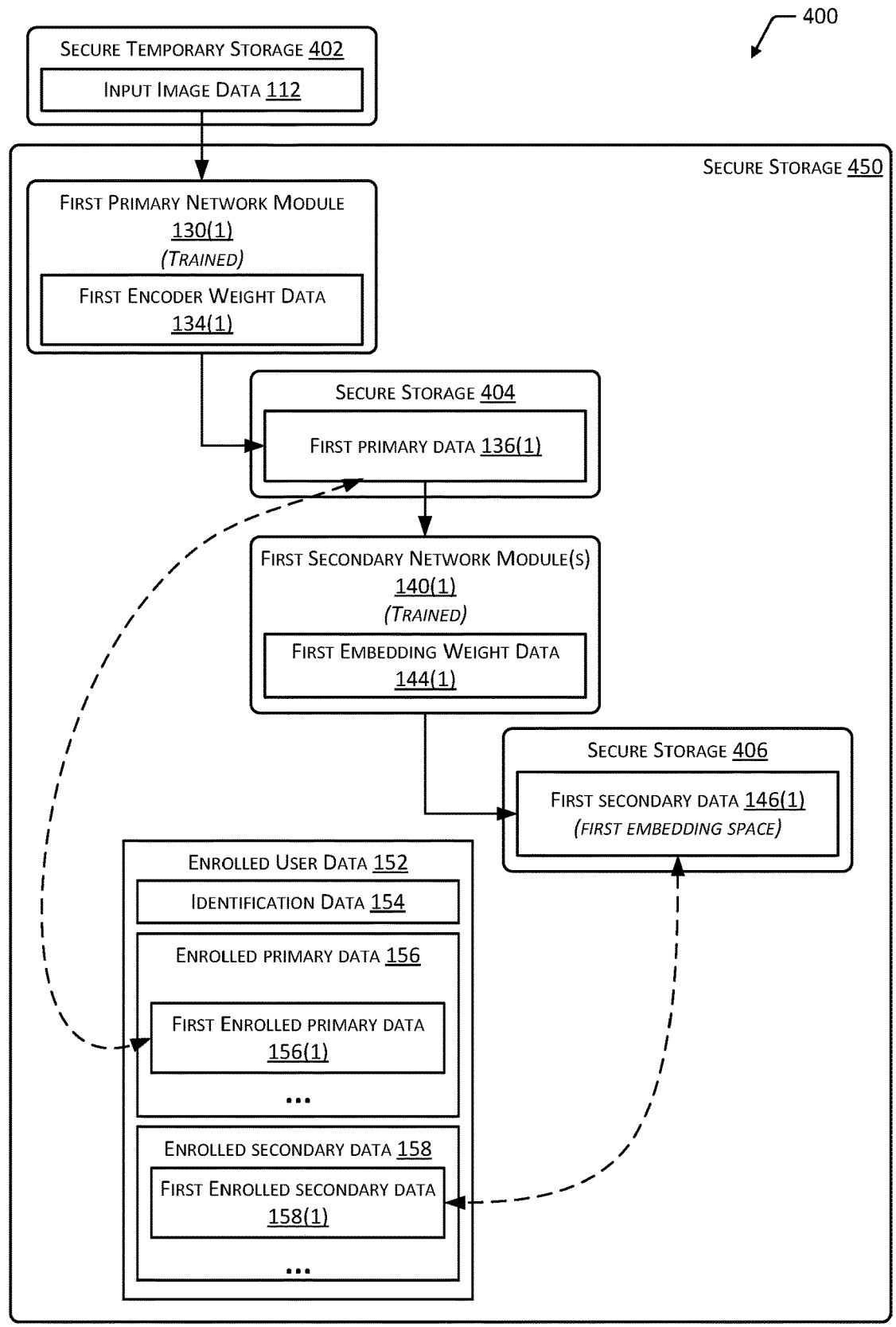
FIG. 4 illustrates a portion of the system in which enrolled primary data and enrolled secondary data is determined and stored, according to some implementations.

FIG. 4 illustrates at 400 a portion of the system 100 in which enrolled primary data 156 and enrolled secondary data 158 is determined and stored, according to some implementations. The system 100 may include different types of secure storage. Types of secure storage may be differentiated based on one or more of: duration of storage, physical location of storage devices, physical security associated with the storage devices, encryption used, access controls used, redundancy, and so forth. For example, a first type of secure storage may implement a first set of access controls that provides access to an extremely small number of users requiring multifactor and biometric input, limited to access at specified secure facilities, for data that is stored on physical storage devices within a physically secure facility. Access controls may limit the ability to retrieve data, manipulate data, export data, and so forth. Other techniques may also be used to secure the data.

The system 100 may include secure temporary storage 402. One or more of the scanner 104, the computing device 106, or other devices may utilize the secure temporary storage 402. The secure temporary storage 402 provides temporary storage that is protected by one or more physical and other methodologies to prevent access. For example, the secure temporary storage 402 may comprise a random access memory device that includes physical anti-tamper mechanisms and is located within or in communication with a secure enclave or secure computing environment to prevent unauthorized access to the data therein. Information stored within the secure temporary storage 402 may not persist after loss of electrical power, after an erasure operation, after a specified length of time, and so forth.

In the implementation depicted here, the input image data 112 is stored in the secure temporary storage 402.

Other modules and data associated with the system is stored in secure storage 450. A primary network module 130 may access the input image data 112 to determine primary data 136. In the implementation depicted, a trained first primary network module 130(1) uses first encoder weight data 134(1) to process the input image data 112 and determine first primary data 136(1).

The first primary data 136(1) may be stored in secure storage 404. The secure storage 404 may be persistent. The secure storage 404 may comprise a subset of the secure storage 450 or a separate system. As discussed with regard to enrollment, the enrollment module 150 may store the primary data 136 as enrolled primary data 156. For example, the first primary data 136(1) may be stored as the first enrolled primary data 156(1) that is associated with particular identification data 154.

A secondary network module 140 may access the primary data 136 and determine secondary data 146. In the implementation depicted, a trained first secondary network module 140(1) uses first embedding weight data 144(1) to process the first primary data 136(1) and determine first secondary data 146(1).

The first secondary data 146(1) may be stored in secure storage 406. The secure storage 406 may be persistent. The secure storage 406 may comprise a subset of the secure storage 450 or a separate system. As discussed with regard to enrollment, the enrollment module 150 may store the first secondary data 146(1) as enrolled secondary data 158. For example, the first secondary data 146(1) may be stored as the first enrolled secondary data 158(1) that is associated with the particular identification data 154. As depicted in this illustration, the first enrolled primary data 156(1) and the first enrolled secondary data 158(1) are associated with one another and the same identification data 154. As discussed in the following figures, one or more of additional instances of enrolled primary data 156 or enrolled secondary data 158 may be associated with a single instance of identification data 154. For example, a single instance of identification data 154 for a single user "Bob" may be associated with one or more instances of enrolled primary data 156, one or more instances of enrolled secondary data 158, and so forth.

Figure 5:
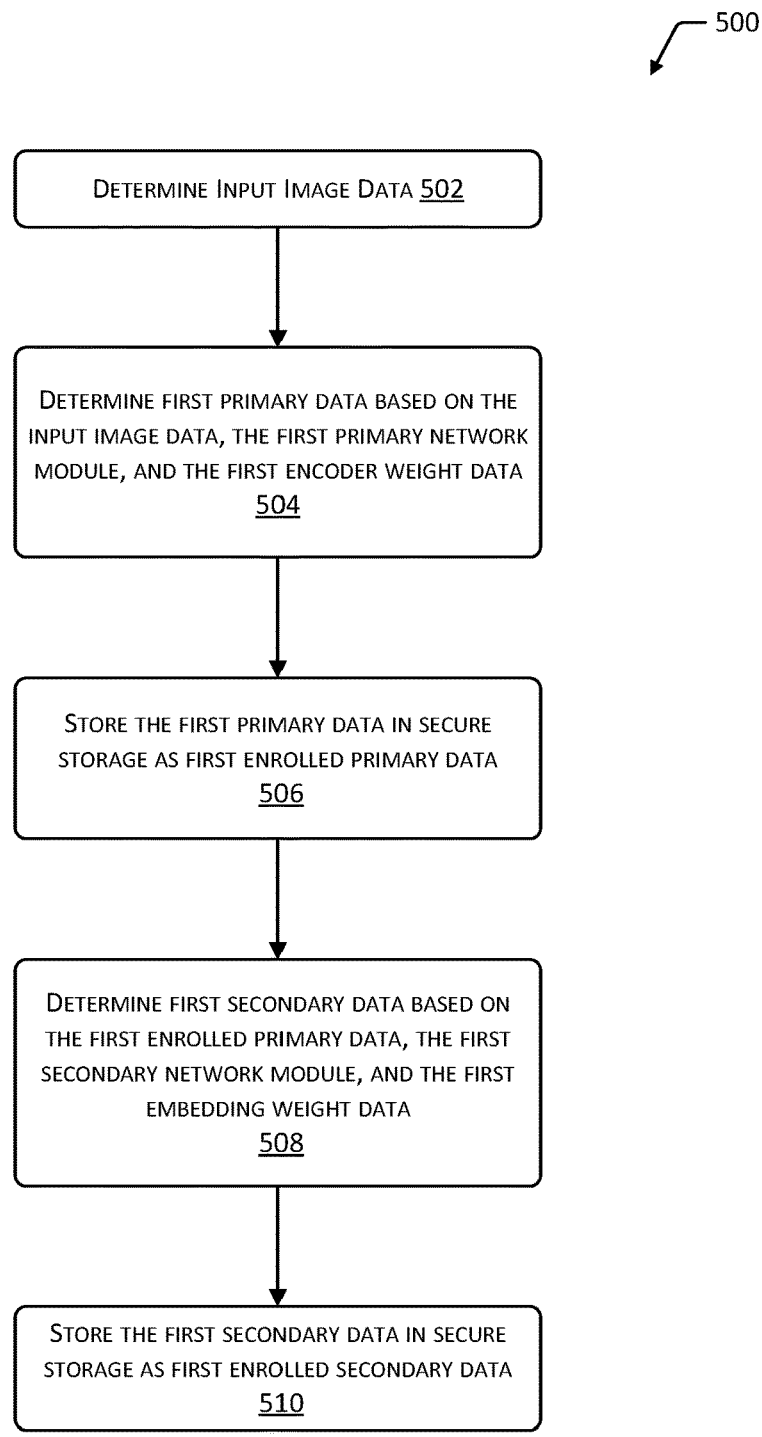
FIG. 5 illustrates a flow diagram of a process to determine enrolled secondary data, according to some implementations.

FIG. 5 illustrates a flow diagram 500 of a process to determine enrolled secondary data 158, according to some implementations. In some implementations, the process or portions thereof may be executed at least in part by one or more of the scanner 104, the computing devices 106, or other devices.

At 502 input image data 112 is determined. For example, the scanner 104 may acquire the input image data 112. The input image data 112 may be stored for processing in the secure temporary storage 402.

At 504 first primary data 136(1) is determined based on the input image data 112, the first primary network module 130(1), and the first encoder weight data 134(1). For example, the first primary network module 130(1) accepts the first input image data 112 as input and determines first primary data 136(1) as output.

At 506 the first primary data 136(1) is stored in secure storage as first enrolled primary data 156(1). For example, the first enrolled primary data 156(1) may be stored in the secure storage 404.

At 508 first secondary data 146(1) is determined based on the first enrolled primary data 156(1), the first secondary network module 140(1), and the first embedding weight data 144(1).

At 510 the first secondary data 146(1) is stored in secure storage as first enrolled secondary data 158(1). For example, the first enrolled secondary data 158(1) may be stored in the secure storage 406.

While the enrolled user data 152 maintains the relationship between the identification data 154 and biometric data such as the enrolled primary data 156 and the enrolled secondary data 158, the data may be stored in different secure storage. For example, a first secure storage may be used to store the identification data 154 and references to entries in other secure storage.

In some implementations, one or more of different primary network modules 130 or secondary network modules 140 may be used for different groups of users. For example, users that are enrolled and associated with a particular grouping such as a company, geographic region, country, or other division may utilize primary network modules 130 or secondary network modules 140 that have associated weights differing from other entities. For example, users enrolled with "Company A" may utilize a primary network module 130 having an encoder module 132 using third encoder weight data 134(3) and utilize a secondary network module 140 having an embedding module 142 using third embedding weight data 144(3). Continuing the example, users enrolled with "Company B" may utilize the primary network module 130 having an encoder module 132 using fourth encoder weight data 134(4) and utilize the secondary network module 140 having an embedding module 142 using fourth embedding weight data 144(4). The same user, presenting the same hand 102, would thus have two different enrolled primary data 156 (each associated with a different entity) and two different enrolled secondary data 158 (each associated with a different entity).

In some situations, one or more of the operations may be performed before a deprecation condition is deemed to exist. In a first situation, additional versions of one or more of enrolled primary data 156 or enrolled secondary data 158 may be determined and stored for later use. Modifying the earlier example, one or more of the second enrolled primary data 156(2) or the second enrolled secondary data 158(2) may be determined before a deprecation is deemed to have occurred. This results in one or more of the second enrolled primary data 156(2) or the second enrolled secondary data 158(2) being immediately available for use. As a result, if one or more of this data is deprecated, one or more of the second enrolled primary data 156(2) or the second enrolled secondary data 158(2) may be used immediately.

Figure 6:
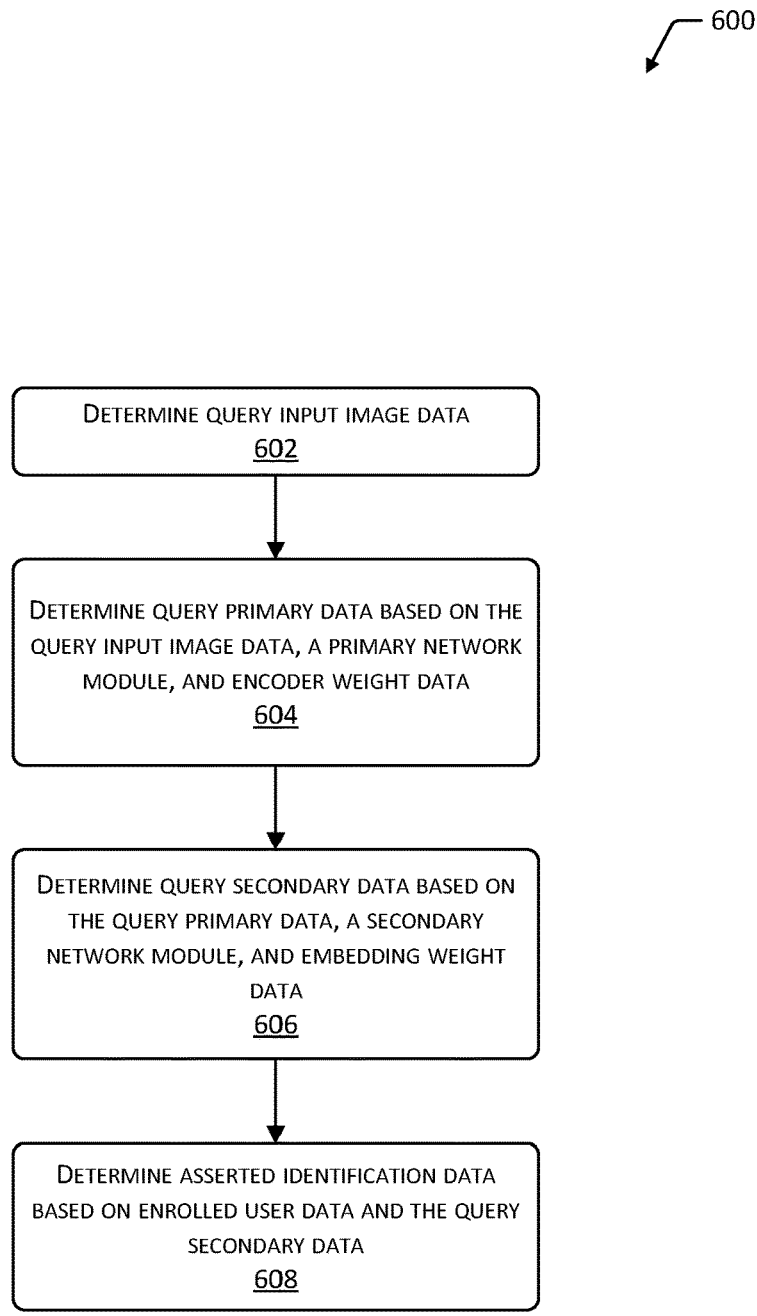
FIG. 6 illustrates a flow diagram of a process of determining asserted identification data, according to some implementations.

FIG. 6 illustrates a flow diagram 600 of a process of determining asserted identification data 164, according to some implementations. The process may be implemented at least in part using one or more computing devices 106.

At 602 a query input image is determined. For example, the scanner 104 may be used to acquire input image data 112. The input image data 112 may comprise one or more modalities.

At 604 query primary data 136 is determined based on the query input image data, a primary network module 130, and encoder weight data 134. For example, the query input image may be provided as an input to the trained primary network module 130 that uses the encoder weight data 134 to determine the query primary data 136.

At 606 query secondary data 162 is determined based on the query primary data 136, a secondary network module 140, and embedding weight data 144. For example, the query primary data 136 may be provided as an input to the trained secondary network module 140 that uses the embedding weight data 144 to determine the query secondary data 162.

At 608 asserted identification data 164 is determined based on enrolled user data 152 and the query secondary data 162. For example, the comparison module 160 may compare the query secondary data 162 and the enrolled secondary data 158 of the enrolled user data 152 to determine the asserted identification data 164.

Figure 7:
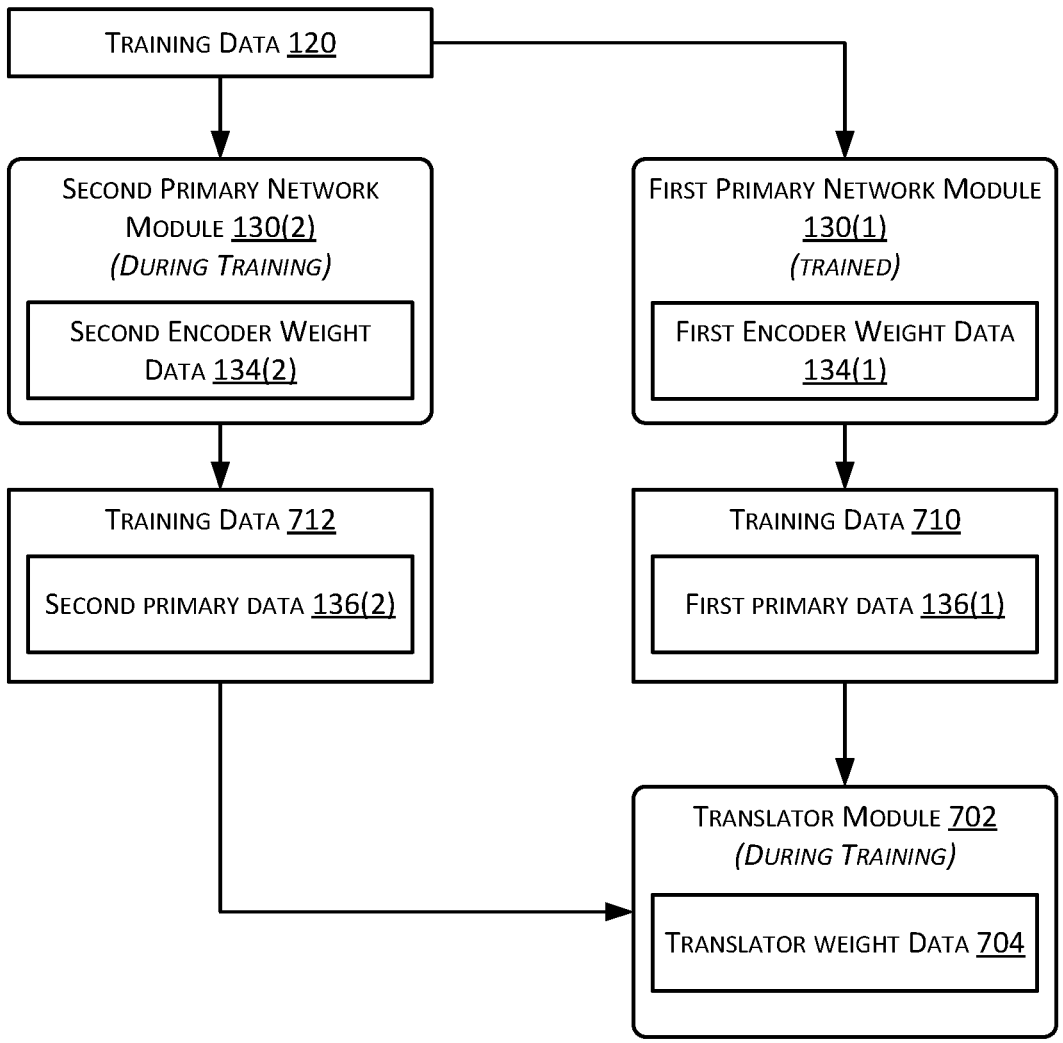
FIG. 7 illustrates a system to train a translator module to translate first primary data to second primary data, according to some implementations.

FIG. 7 illustrates a system 700 to train a translator module 702 to translate first primary data 136(1) to second primary data 136(2), according to some implementations.

In one implementation the translator module 702 may comprise a neural network trained to translate an input to an output. In some implementations the translator module 702 may determine a rotation matrix that is used to process input and determine output.

In some implementations, the translator module 702 may comprise a deep-learning neural network. Some implementations may utilize an attention mechanism. The attention mechanism allows the translator to learn during training how particular portions of the input will affect the output. For example, the attention mechanism allows the translator module 702 to learn which portions of an input primary data 136 are to be given greater weight or consideration during subsequent processing to determine an output primary data 136. The translator module 702 may implement an encoder-decoder architecture. In this architecture, an encoder comprising encoding layers processes the input iteratively, with successive layers of the encoder network processing the input. A decoder comprising decoding layers processes the output from the encoder iteratively, with successive layers of the decoder network processing the output from the encoder. The encoder layers and the decoder layers may implement a feed-forward neural network. One or more encoder layers may utilize an attention mechanism to use information from the output of previous encoder layers. One or more decoder layers may utilize an attention mechanism to use information from the output of previous decoder layers.

During training of the translator module 702 to determine the translator weight data 704, training data is used. A first set of training data may comprise the training data 120. For example, the input image data 112 that has been designated for training use.

Based on the first set of training data, a second set of training data and a third set of training data are determined. The second set of training data comprises first primary data 136(1) and the second set of training data comprises second primary data 136(2). The second set of training data and the third set of training data are associated with the same training identities. For example, for a training identity of "4941" the second set of training data includes first primary data 136(1) based on that input image data 112 while the third set of training data includes second primary data 136(2) based on the same input image data 112.

In this illustration, the training data 120 is processed by the trained first primary network module 130(1) and the first encoder weight data 134(1) to determine the second set of training data, such as training data 710.

The training data 120 is processed by the trained second primary network module 130(2) and the second encoder weight data 134(2) to determine the third set of training data, such as training data 712.

The translator module 702 may then be trained to translate the first primary data 136(1) to the second primary data 136(2) using the second set of training data and the third set of training data. Once trained, the translator module 702 may accept as input first primary data 136(1) and provide as output second primary data 136(2).

By using the trained translator module 702, the primary data 136 may be converted without requiring re-enrollment of the user.

Figure 8:
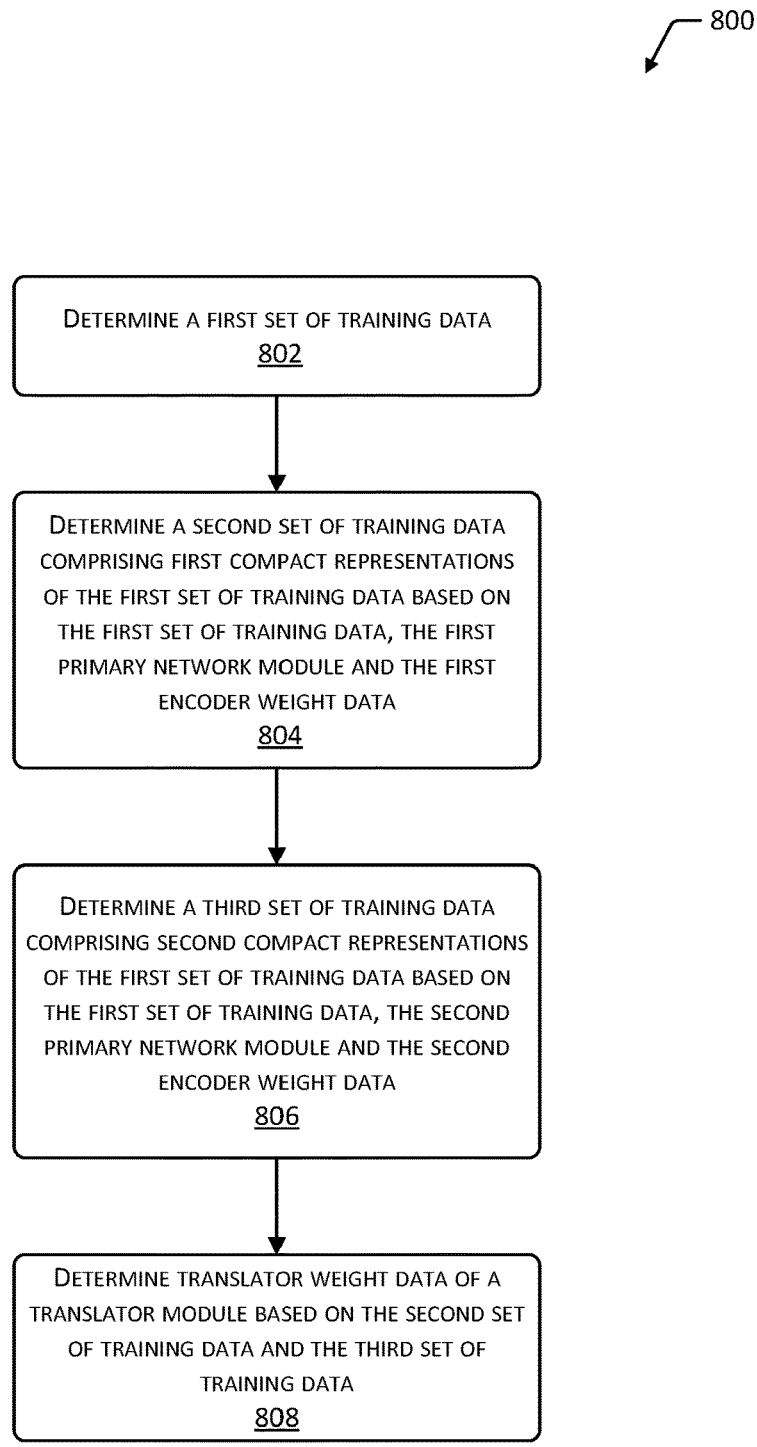
FIG. 8 illustrates a flow diagram of a process to determine translator weight data, according to some implementations.

FIG. 8 illustrates a flow diagram 800 of a process to determine translator weight data 704, according to some implementations. The process may be implemented at least in part using one or more computing devices 106.

At 802 a first set of training data is determined. For example, the training data 120 or a portion thereof may be used.

At 804 a second set of training data is determined comprising first primary data of the first set of training data. The first primary data may be determined based on processing the first set of training data with the first primary network module 130(1) using the first encoder weight data 134(1). For example, individual input image data 112 in the training data 120 may be processed using the first primary network module 130(1) to determine first training primary data 136(1).

At 806 a third set of training data is determined comprising second primary data of the first set of training data. The second primary data may be determined based on processing the first set of training data with the second primary network module 130(2) using the second encoder weight data 134(2). For example, individual input image data 112 in the training data 120 may be processed using the second primary network module 130(2) to determine second training primary data 136(2).

At 808 translator weight data 704 of the translator module 702 is determined based on the second set of training data and the third set of training data. For example, the translator module 702 may be trained using the second set of training data and the third set of training data to determine the translator weight data 704.

One or more of the operations in this process may be performed before a deprecation condition is deemed to exist. For example, encoder weight data 134(N) and translator weight data 704(X) may be determined in advance. Upon determination that data is to be deprecated, the trained network modules are available for immediate use. This substantially reduces the latency associated with subsequent operation.

Figure 9:
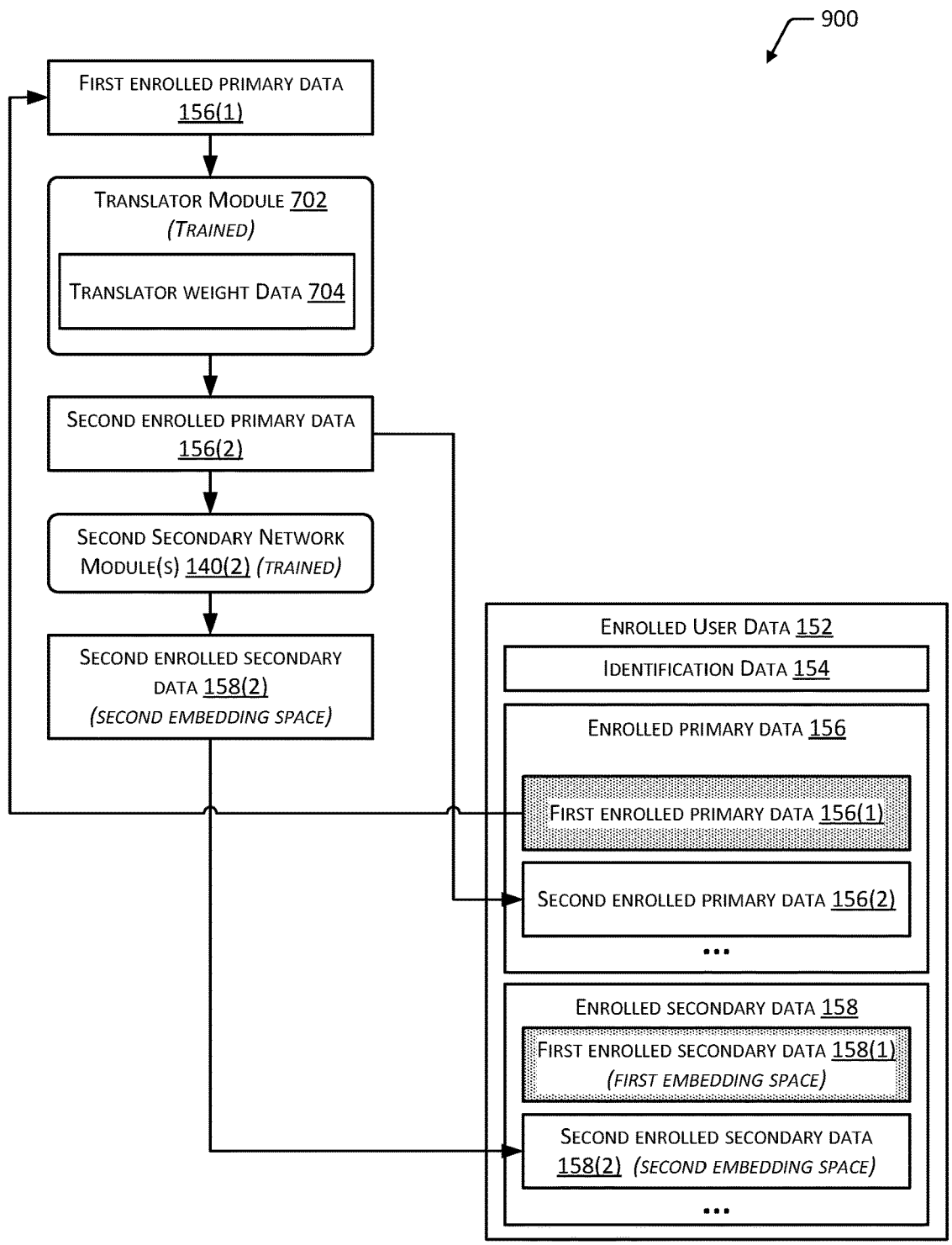
FIG. 9 illustrates a system in which first enrolled primary data is deprecated and replaced with second enrolled primary data and associated with second enrolled secondary data, according to some implementations.

FIG. 9 illustrates a system 900 in which first enrolled primary data 156(1) is deprecated and replaced with second enrolled primary data 156(2) and associated second enrolled secondary data 158(2), according to some implementations. In some situations, primary data 136 may be deprecated and replaced.

First enrolled primary data 156(1) is deemed to be deprecated. The first enrolled primary data 156(1) is provided as input to a trained translator module 702. The translator module 702 provides as output second enrolled primary data 156(2).

The second enrolled primary data 156(2) may then be stored. For example, the second enrolled primary data 156(2) may be stored in secure storage 404. The second enrolled primary data 156(2) may be associated with one or more of the first enrolled primary data 156(1) or a specified identification data 154 that is associated with the first enrolled primary data 156(1).

The second enrolled primary data 156(2) is provided as input to a trained second secondary network module 140(2). The second secondary network module 140(2) provides as output second enrolled secondary data 158(2). The second enrolled secondary data 158(2) is associated with a second embedding space, while the first enrolled secondary data 158(1) is associated with the same identity associated with a first embedding space.

The second enrolled secondary data 158(2) may then be stored. For example, the second enrolled secondary data 158(2) may be stored in secure storage 406. The second enrolled secondary data 158(2) may be associated with one or more of the first enrolled primary data 156(1) or a specified identification data 154 that is associated with the first enrolled primary data 156(1).

In some situations, one or more of the operations may be performed before a deprecation condition is deemed to exist. In a first situation, additional versions of one or more of enrolled primary data 156 or enrolled secondary data 158 may be determined and stored for later use. Modifying the earlier example, one or more of the second enrolled primary data 156(2) or the second enrolled secondary data 158(2) may be determined before a deprecation is deemed to have occurred. This results in one or more of the second enrolled primary data 156(2) or the second enrolled secondary data 158(2) being immediately available for use. As a result, if one or more of this data is deprecated, one or more of the second enrolled primary data 156(2) or the second enrolled secondary data 158(2) may be used immediately.

Figure 10:
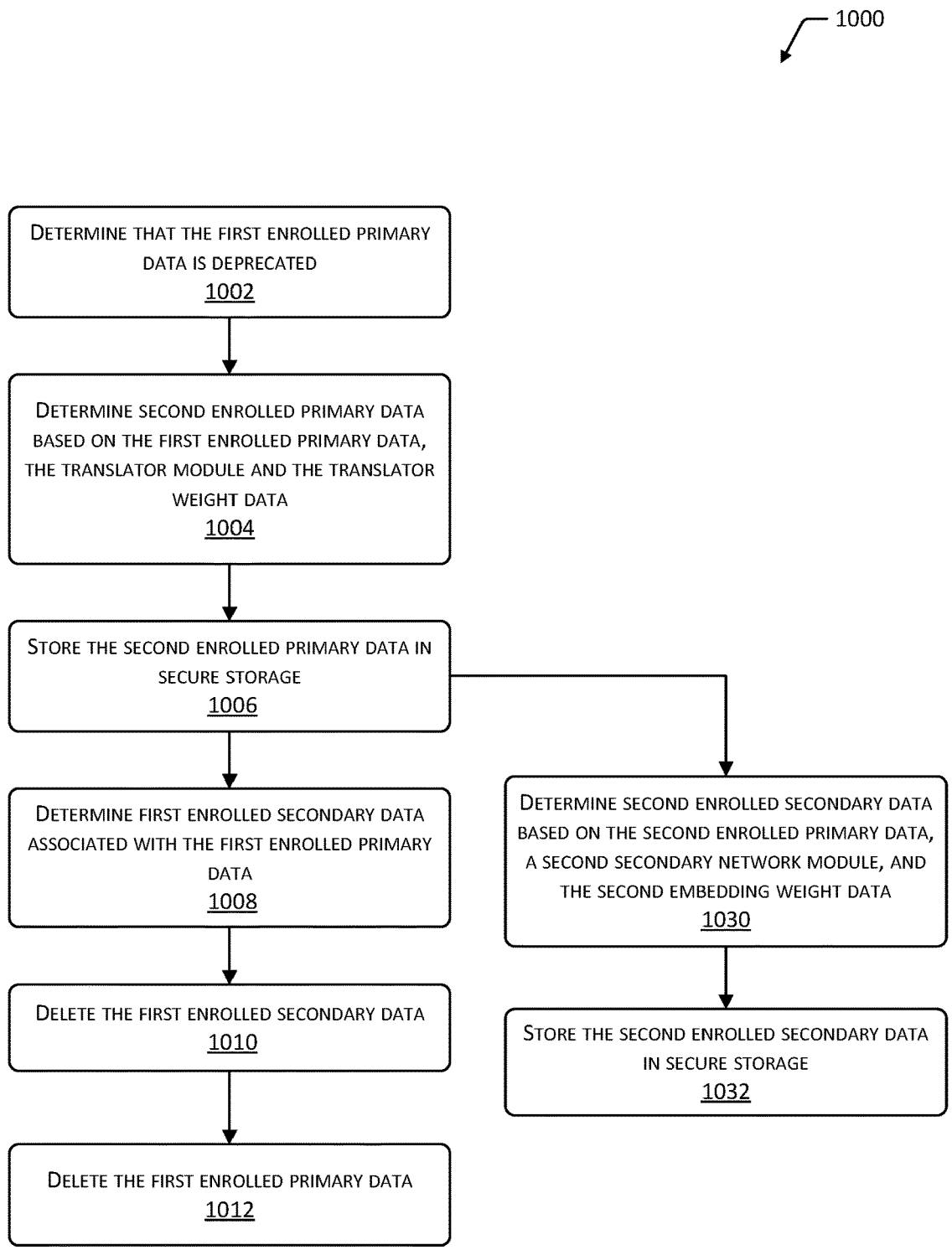
FIG. 10 illustrates a flow diagram of a process to deprecate and replace first enrolled primary data, according to some implementations.

FIG. 10 illustrates a flow diagram 1000 of a process to deprecate and replace first enrolled primary data 156(1), according to some implementations. In some implementations the process may be executed at least in part by one or more computing devices 106.

At 1002 a determination is made to deprecate the first enrolled primary data 156(1). For example, one or more deprecation criteria may have been met, a message to deprecate may have been received, a user may have initiated deprecation, or an administrator may have initiated deprecation.

At 1004 second enrolled primary data 156(2) is determined based on the first enrolled primary data 156(1), the translator module 702, and the translator weight data 704. For example, the translator module 702 may accept as input the first enrolled primary data 156(1) and provide as output second enrolled primary data 156(2).

At 1006 the second enrolled primary data 156(2) is stored. For example, the second enrolled primary data 156(2) may be stored in the secure storage 404.

At 1008 first enrolled secondary data 158(1) that is associated with the first enrolled primary data 156(1) is determined. For example, the enrolled user data 152 may be used to determine the association.

At 1010 the first enrolled secondary data 158(1) is deleted.

At 1012 the first enrolled primary data 156(1) is deleted. In some implementations 1012 may be performed after 1032.

At 1030 second enrolled secondary data 158(2) is determined based on the second enrolled primary data 156(2), the second secondary network module 140(2), and the second embedding weight data 144. For example, the second secondary network module 140(2) may accept as input second enrolled primary data 156(2) and provide as output the second enrolled secondary data 158(2).

At 1032 the second enrolled secondary data 158(2) is stored. For example, the second enrolled secondary data 158(2) may be stored in the secure storage 406.

As described above, in some situations, one or more of the operations may be performed before a deprecation condition is deemed to exist.

In some implementations an alternative order of these operations may be used. In one implementation, operation 1002 may be deferred until after 1008. Additional versions of one or more of enrolled primary data 156 or enrolled secondary data 158 may be determined in advance and stored for later use. Upon a determination that data is to be deprecated, the system 100 may proceed to using the data previously stored at 1008 and 1032, and then proceed to 1010. This substantially reduces the latency associated with a deprecation becoming effective.

Figure 11A:
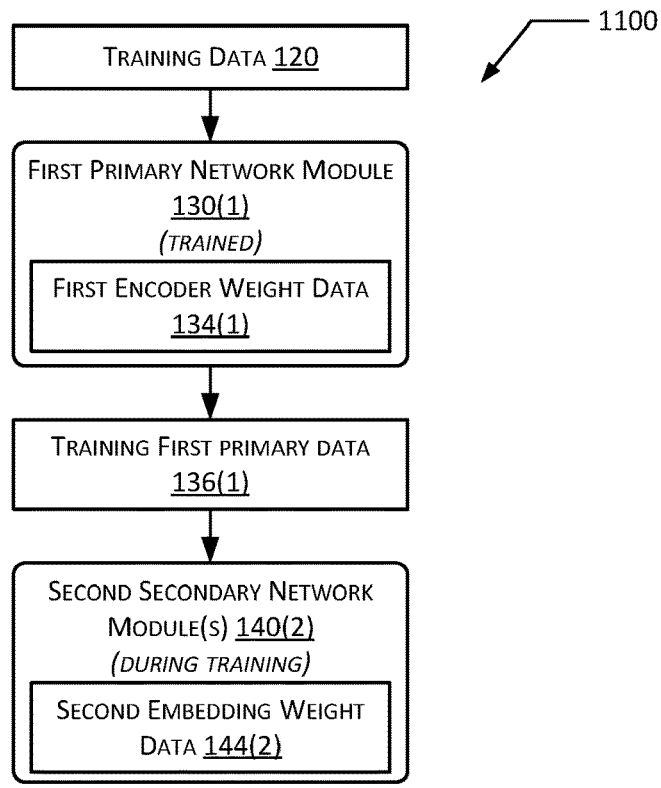
FIG. 11A illustrates a system to train a second secondary network module using first primary data, according to some implementations.

FIG. 11A illustrates a system 1100 to train a second secondary network module 140(2) using first primary data 136(1), according to some implementations. In some implementations the process may be executed at least in part by one or more computing devices 106. In some implementations, secondary data 146 such as the enrolled secondary data 158 may be deprecated or another use may arise in which a different embedding associated with the same identity is to be generated. First training data comprising the training data 120 is used to train a first primary network module 130(1) to determine first encoder weight data 134 (1). Once trained, the first primary network module 130(1) and the first encoder weight data 134(1) are used to determine second training data comprising the training first primary data 136(1) corresponding to the training data 120.

The second training data is used to train a second secondary network module 140(2) to determine second embedding weight data 144(2).

Figure 11B:
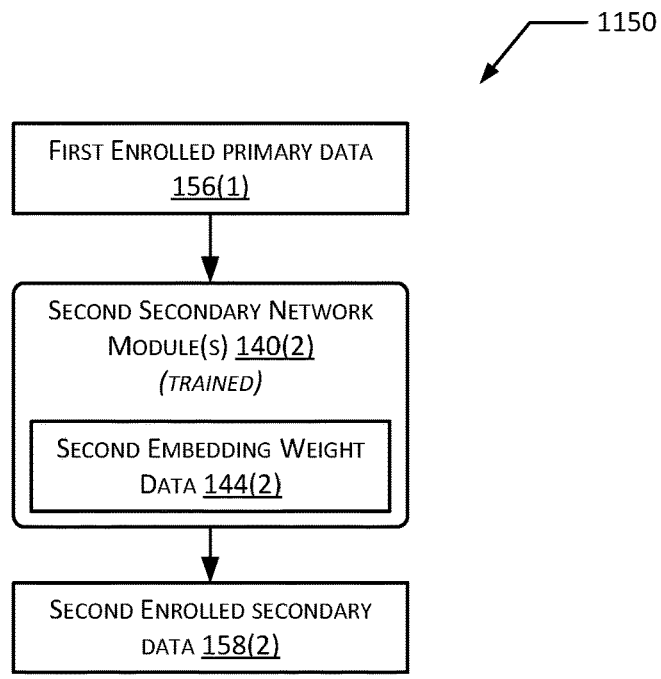
FIG. 11B illustrates a system to use the trained second secondary network module to determine second enrolled secondary data, according to some implementations.

FIG. 11B illustrates a system 1150 to use the trained second secondary network module 140(2) to determine second enrolled secondary data 158(2), according to some implementations. In some implementations the process may be executed at least in part by one or more computing devices 106. In some implementations, secondary data 146 such as the enrolled secondary data 158 may be deprecated or another use may arise in which a different embedding associated with the same identity is to be generated.

Once trained, second enrolled secondary data 158(2) is determined based on the first enrolled primary data 156(1), the second secondary network module 140(2), and the second embedding weight data 144(2). For example, the trained second secondary network module 140(2) processes the first enrolled primary data 156(1) and determines the second enrolled secondary data 158(2). As described above, because of the variability in training and operation, even with the input of the same primary data 136, the secondary data 146 resulting from different secondary network modules 140 will differ.

The second enrolled secondary data 158(2) may then be stored. For example, the second enrolled secondary data 158(2) may be stored in the secure storage 406.

Figure 12:
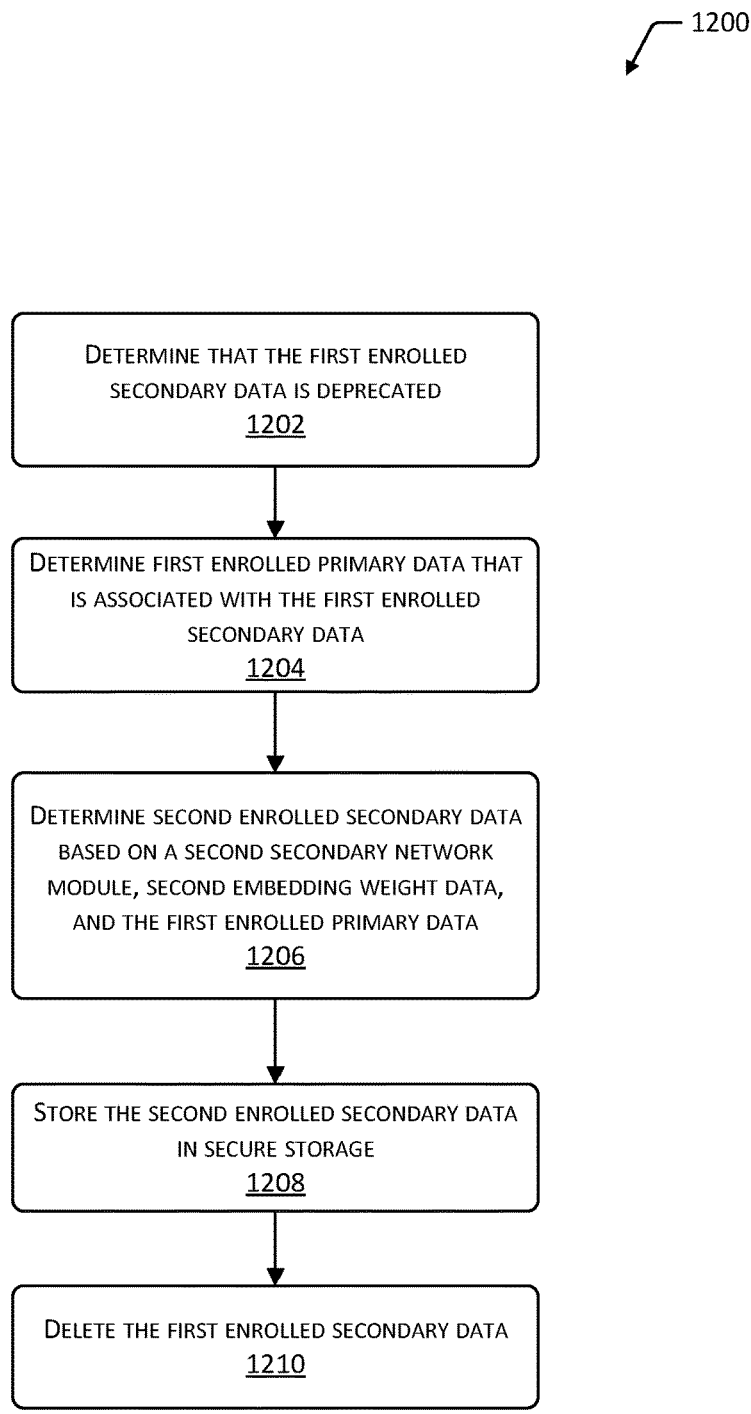
FIG. 12 illustrates a flow diagram of a process to replace deprecated first enrolled secondary data with second enrolled secondary data, according to some implementations.

FIG. 12 illustrates a flow diagram 1200 of a process to replace deprecated first enrolled secondary data 158(1) with second enrolled secondary data 158(2), according to some implementations. In some implementations the process may be executed at least in part by one or more computing devices 106.

At 1202 a determination is made to deprecate the first enrolled secondary data 158(1). For example, one or more deprecation criteria may have been met, a message to deprecate may have been received, a user may have initiated deprecation, or an administrator may have initiated deprecation.

At 1204 first enrolled primary data 156(1) is determined that is associated with the first enrolled secondary data 158(1). For example, the enrolled user data 152 may include one or more indexes or points that associate the first enrolled secondary data 158(1) with the first enrolled primary data 156(1).

At 1206 second enrolled secondary data 158(2) is determined based on the second secondary network module 140(2), the second embedding weight data 144(2), and the first enrolled primary data 156(1). For example, the trained second secondary network module 140(2) processes the first enrolled primary data 156(1) to determine the second enrolled secondary data 158(2).

At 1208 the second enrolled secondary data 158(2) is stored in secure storage. For example, the second enrolled secondary data 158(2) may be stored in the secure storage 406.

At 1210 the first enrolled secondary data 158(1) is deleted. In other implementations other operations may be performed.

In some implementations an alternative order of these operations may be used. In one implementation, operation 1202 may be deferred until after 1208. Additional versions of enrolled secondary data 158 may be determined in advance and stored for later use. Upon a determination that data is to be deprecated, the system 100 may proceed to using the data previously stored at 1208, and then proceed to 1210. This substantially reduces the latency associated with a deprecation becoming effective.

Figure 13:
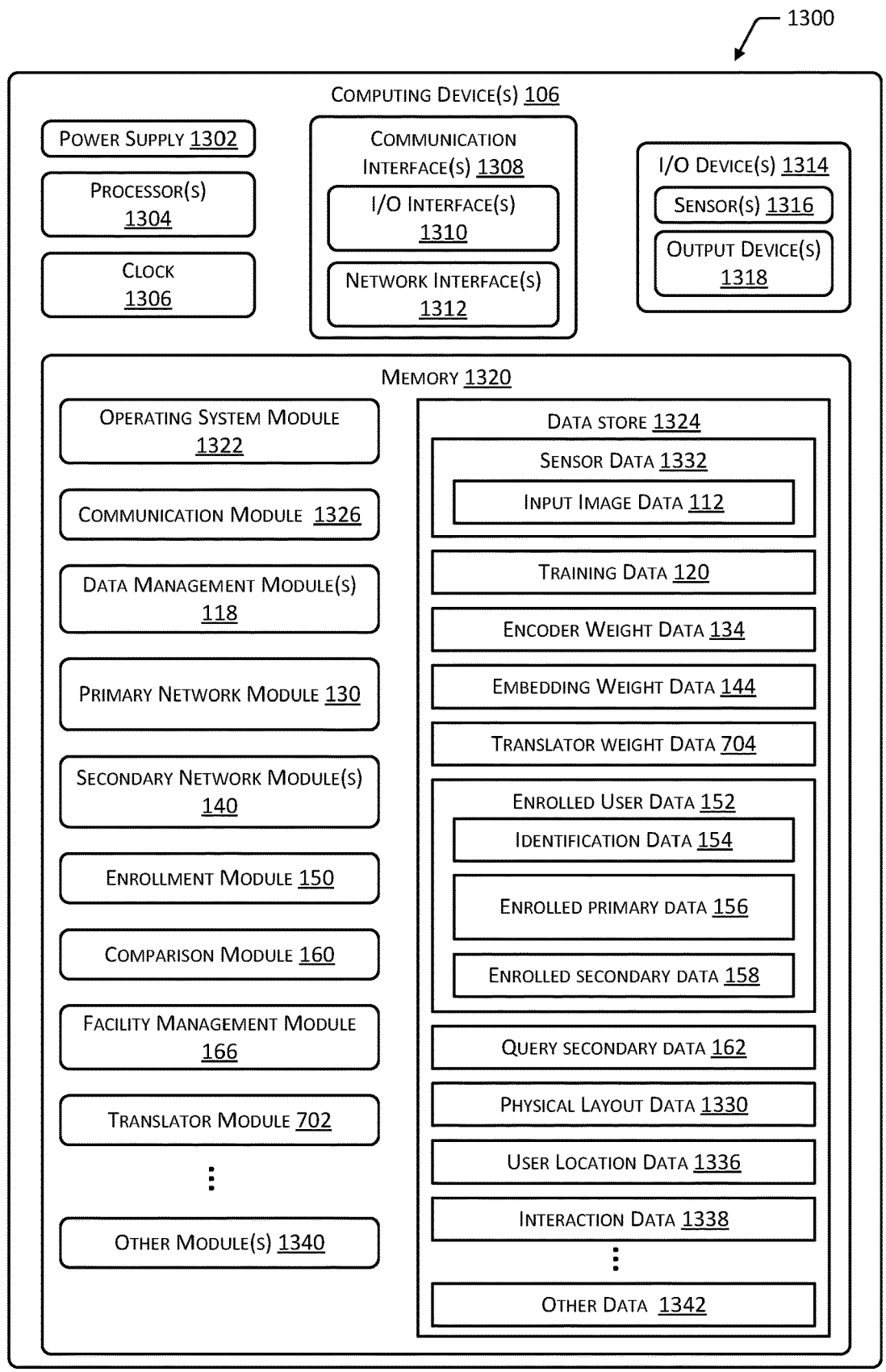
FIG. 13 is a block diagram of a computing device to implement the system, according to some implementations.

FIG. 13 is a block diagram 1300 of a computing device 106 to implement the system 100 or portion thereof, according to some implementations.

The computing device 106 may be within the scanner 104, may comprise a server, and so forth. The computing device 106 may be physically present at the facility, may be accessible by a network, or a combination of both. The computing device 106 does not require end-user knowledge of the physical location and configuration of the system that delivers the services. Common expressions associated with the computing device 106 may include "embedded system", "on-demand computing", "software as a service (SaaS)", "platform computing", "network-accessible platform", "cloud services", "data centers", and so forth. Services provided by the computing device 106 may be distributed across one or more physical or virtual devices.

One or more power supplies 1302 may be configured to provide electrical power suitable for operating the components in the computing device 106. The one or more power supplies 1302 may comprise batteries, capacitors, fuel cells, photovoltaic cells, wireless power receivers, conductive couplings suitable for attachment to a power source such as provided by an electric utility, and so forth. The computing device 106 may include one or more hardware processors 1304 (processors) configured to execute one or more stored instructions. The processors 1304 may comprise one or more cores. One or more clocks 1306 may provide information indicative of date, time, ticks, and so forth. For example, the processor 1304 may use data from the clock 1306 to associate a particular interaction with a particular point in time.

The computing device 106 may include one or more communication interfaces 1308 such as input/output (I/O) interfaces 1310, network interfaces 1312, and so forth. The communication interfaces 1308 enable the computing device 106, or components thereof, to communicate with other devices or components. The communication interfaces 1308 may include one or more I/O interfaces 1310. The I/O interfaces 1310 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1310 may couple to one or more I/O devices 1314. The I/O devices 1314 may include input devices such as one or more of a sensor 1316, keyboard, mouse, scanner, and so forth. The I/O devices 1314 may also include output devices 1318 such as one or more of a display device, printer, audio speakers, and so forth. In some embodiments, the I/O devices 1314 may be physically incorporated with the computing device 106 or may be externally placed. The sensors 1316 may comprise the camera 108, smartcard readers, touch sensors, microphones, and so forth.

The network interfaces 1312 may be configured to provide communications between the computing device 106 and other devices, such as routers, access points, and so forth. The network interfaces 1312 may include devices configured to couple to personal area networks (PANs), local area networks (LANs), wireless local area networks (WLANS), wide area networks (WANs), and so forth. For example, the network interfaces 1312 may include devices compatible with Ethernet, Wi-Fi, Bluetooth, and so forth.

The computing device 106 may also include one or more buses or other internal communications hardware or software that allow for the transfer of data between the various modules and components of the computing device 106.

As shown in FIG. 13, the computing device 106 includes one or more memories 1320. The memory 1320 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1320 provides storage of computer-readable instructions, data structures, program modules, and other data for the operation of the computing device 106. A few example functional modules are shown stored in the memory 1320, although the same functionality may alternatively be implemented in hardware, firmware, or as a system on a chip (SoC).

The memory 1320 may include at least one operating system (OS) module 1322. The OS module 1322 is configured to manage hardware resource devices such as the I/O interfaces 1310, the I/O devices 1314, the communication interfaces 1308, and provide various services to applications or modules executing on the processors 1304. The OS module 1322 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 1326 may be configured to establish communications with the computing device 106, servers, other computing devices 106, or other devices. The communications may be authenticated, encrypted, and so forth.

The data management module 118 may coordinate operation of one or more modules described in this disclosure. In some implementations the data management module 118 may determine data to be deprecated. In other implementations, the data management module 118 may receive a command or message to deprecate data and perform at least some of the operations associated with that deprecation.

Also stored in the memory 1320 may be a data store 1324 and one or more of the following modules. These modules may be executed as foreground applications, background tasks, daemons, and so forth. The data store 1324 may use a flat file, database, linked list, tree, executable code, script, or other data structure to store information. In some implementations, the data store 1324 or a portion of the data store 1324 may be distributed across one or more other devices including other computing devices 106, network attached storage devices, and so forth.

The data store 1324 may store one or more of the training data 120, encoder weight data 134, embedding weight data 144, enrolled user data 152, query secondary data 162, and so forth. The memory 1320 may store the primary network module 130, the enrollment module(s) 150, the comparison module 160, the facility management module 166, and so forth.

In some implementations, the input image data 112 may be temporarily stored during processing by the primary network module 130. For example, the scanner 104 may acquire the input image data 112, determine the primary data 136 based on the input image data 112, and then erase the input image data 112. The resulting primary data 136 may then be sent to a server or other computing device 106 to perform enrollment, for comparison to assert an identity, and so forth.

The primary network module 130 or a portion thereof, such as the trained encoder module 132 may determine the primary data 136 based on input image data 112.

The secondary network modules 140 accept as input one or more of the input image data 112 or the primary data 136 and determine secondary data 146.

The enrollment module 150 may be used to determine the enrolled user data 152.

The facility management module 166 may perform various functions, such as tracking items between different inventory locations, to and from carts, generating restocking orders, directing operation of robots within the facility, using the asserted identification data 164 to associate a particular user identity with a user in the facility, and so forth. During operation, the facility management module 166 may access sensor data 1332 such as input image data 112, or data from other sensors.

The translator module 702 may accept as input first primary data 136(1) and determine second primary data 136(2).

Information used by the facility management module 166 may be stored in the data store 1324. For example, the data store 1324 may be used to store physical layout data 1330, sensor data 1332, asserted identification data 164 (not shown), user location data 1336, interaction data 1338, and so forth. For example, the sensor data 1332 may comprise the input image data 112 obtained from a scanner 104 associated with the facility.

The physical layout data 1330 may provide information indicative of where scanners 104, cameras, weight sensors, antennas for radio receivers, inventory locations, and so forth are in the facility with respect to one another. For example, the physical layout data 1330 may comprise information representative of a map or floor plan of the facility with relative positions of gates with scanners 104 and inventory locations.

The facility management module 166 may generate the user location data 1336 that is indicative of the location of the user within the facility. For example, the facility management module 166 may use image data obtained by the cameras to determine a location of the user. In other implementations, other techniques may be used for determining the user location data 1336. For example, data from a smart floor may be used to determine the location of the user.

The identification data 154 may be associated with user location data 1336. For example, the user enters the facility and has their hand 102 scanned by the scanner 104, resulting in asserted identification data 164 that is associated with their time of entry and the scanner 104 location. The user location data 1336 indicative of a path of a user that begins at the scanner 104 location at the time of entry may be associated with the user identifier in the asserted identification data 164.

Based on the user location data 1336 and the interaction data 1338, a particular interaction may be associated with an account of a particular user. For example, if the user location data 1336 indicates that the user is present in front of inventory location 1392 at time 09:02:02 and the interaction data 1338 indicates a pick of a quantity of one item from an area on inventory location 1392 at 09:04:13, the user may be billed for that pick.

The facility management module 166 may use the sensor data 1332 to generate the interaction data 1338. The interaction data 1338 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 166 may generate interaction data 1338 that indicates what item the user picked from a particular lane on a shelf, and then use this interaction data 1338 to adjust the count of inventory stowed at that lane. The interaction data 1338 may then be used to bill an account associated with the user identifier that is associated with the user who picked the item.

The facility management module 166 may process the sensor data 1332 and generate output data. For example, based on the interaction data 1338, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 1340 may also be present in the memory 1320 as well as other data 1342 in the data store 1324. For example, a billing module may use the interaction data 1338 and the asserted identification data 164 to bill an account associated with a particular user.

The devices and techniques described in this disclosure may be used in a variety of other settings. For example, the system 100 may be used in conjunction with a point-of-sale (POS) device. The user may present their hand 102 to a scanner 104 to provide an indication of intent and authorization to pay with an account associated with the asserted identification data 164. In another example, a robot may incorporate a scanner 104. The robot may use the asserted identification data 164 to determine whether to deliver a parcel to the user, and based on the asserted identification data 164, which parcel to deliver.

While the input to the system 100 is discussed with respect to image data, the system may be used with other types of input. For example, the input may comprise data acquired from one or more sensors, data generated by another system, and so forth. For example, instead of image data produced by the camera 108, the input to the system 100 may comprise an array of data. In other examples, the input to the system 100 may comprise one or more of audio data, point cloud data, and so forth. Other modalities may also be used. For example, the first modality may be visible light, the second modality may be sonar, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a memory, storing first computer-executable instructions; and
   a hardware processor to execute the first computer-executable instructions to:
   determine first enrolled primary data, wherein the first enrolled primary data represents biometric data;
   determine the first enrolled primary data is deprecated at a first time;
   determine second enrolled primary data based on the first enrolled primary data;
   store the second enrolled primary data;
   determine second enrolled secondary data based on the second enrolled primary data; and
   store the second enrolled secondary data.

2. The system of claim 1, further comprising instructions to:
   determine a first set of training data;
   determine a second set of training data comprising first primary data of the first set of training data, wherein the second set of training data is based on the first set of training data, a first primary network module, and first encoder weight data;
   determine a third set of training data comprising second primary data of the first set of training data, wherein the third set of training data is based on the first set of training data, a second primary network module, and second encoder weight data;
   determine translator weight data of a translator module based on the second set of training data and the third set of training data; and
   wherein the determining the second enrolled primary data is further based on the translator module and the translator weight data.

3. The system of claim 1, further comprising instructions to, before the first time:
   determine a first set of training data;

determine a second set of training data comprising first primary data of the first set of training data, wherein the second set of training data is based on the first set of training data, a first primary network module, and first encoder weight data;

determine a third set of training data comprising second primary data of the first set of training data, wherein the third set of training data is based on the first set of training data, a second primary network module, and second encoder weight data;

determine translator weight data of a translator module based on the second set of training data and the third set of training data; and wherein the determining the second enrolled primary data is further based on the translator module and the translator weight data.

4. The system of claim 1, further comprising instructions to:

determine a first set of training data;

determine a second set of training data comprising first primary data of the first set of training data, wherein the second set of training data is based on the first set of training data, a first primary network module, and first encoder weight data;

determine first embedding weight data based on a first secondary network module and the second set of training data;

determine first enrolled secondary data based on the first enrolled primary data, the first secondary network module, and the first embedding weight data;

determine a third set of training data comprising second primary data of the first set of training data, wherein the third set of training data is based on the first set of training data, a second primary network module, and second encoder weight data;

determine second embedding weight data based on a second secondary network module and the third set of training data; and wherein the determining the second enrolled secondary data is further based on the second secondary network module and the second embedding weight data.

5. The system of claim 1, further comprising instructions to:

determine query input image data;

determine query primary data based on the query input image data, a second primary network module, and second encoder weight data;

determine query secondary data based on the query primary data, a second secondary network module, and second embedding weight data; and determine identification data that is associated with the query input image data based on the query secondary data and previously stored enrolled secondary data.

6. The system of claim 1, further comprising instructions to:

determine identification data associated with a first user;

determine input image data of the first user;

wherein the determining the first enrolled primary data is based on a first primary network module, first encoder weight data, and the input image data; and associate the identification data with the first enrolled primary data.

7. A method comprising:

determining first enrolled primary data is deprecated at a first time, wherein the first enrolled primary data represents biometric data;

determining second enrolled primary data based on the first enrolled primary data;

storing the second enrolled primary data;

determining first enrolled secondary data associated with the first enrolled primary data;

determining second enrolled secondary data based on the second enrolled primary data; and storing the second enrolled secondary data.

8. The method of claim 7, further comprising:

determining identification data associated with a first user;

determining input image data of the first user;

determining the first enrolled primary data based on a first primary network module, first encoder weight data, and the input image data; and associating the identification data with the first enrolled primary data.

9. The method of claim 7, further comprising:

determining a first set of training data;

determining a second set of training data comprising first primary data of the first set of training data, wherein the second set of training data is based on the first set of training data, a first primary network module, and first encoder weight data;

determining a third set of training data comprising second primary data of the first set of training data, wherein the third set of training data is based on the first set of training data, a second primary network module, and second encoder weight data;

determining translator weight data of a translator module based on the second set of training data and the third set of training data; and wherein the determining the second enrolled primary data is further based on the translator module and the translator weight data.

10. The method of claim 7, further comprising, before the first time:

determining a first set of training data;

determining a second set of training data comprising first primary data of the first set of training data, wherein the second set of training data is based on the first set of training data, a first primary network module, and first encoder weight data;

determining a third set of training data comprising second primary data of the first set of training data, wherein the third set of training data is based on the first set of training data, a second primary network module, and second encoder weight data;

determining translator weight data of a translator module based on the second set of training data and the third set of training data; and wherein the determining the second enrolled primary data is further based on the translator module and the translator weight data.

11. The method of claim 7, further comprising:

determining a first set of training data;

determining a second set of training data comprising first primary data of the first set of training data, wherein the second set of training data is based on the first set of training data, a first primary network module, and first encoder weight data;

determining first embedding weight data based on a first secondary network module and the second set of training data;

wherein the determining the first enrolled secondary data is further based on the first secondary network module and the first embedding weight data;

determining a third set of training data comprising second primary data of the first set of training data, wherein the third set of training data is based on the first set of training data, a second primary network module, and second encoder weight data;

determining second embedding weight data based on a second secondary network module and the third set of training data; and wherein the determining the second enrolled secondary data is further based on the second secondary network module and the second embedding weight data.

12. The method of claim 7, further comprising:

determining query input image data;

determining query primary data based on the query input image data, a second primary network module, and second encoder weight data;

determining query secondary data based on the query primary data, a second secondary network module, and second embedding weight data; and determining identification data that is associated with the query input image data based on the query secondary data and previously stored enrolled secondary data.

13. The method of claim 7, wherein the determining the first enrolled primary data is deprecated comprises one or more of:

determining the first enrolled primary data has expired, determining unauthorized access to the first enrolled primary data, determining a count of accesses to the first enrolled primary data has exceeded a threshold value, or receiving a message.

14. A method comprising:

determining first enrolled primary data is deprecated at a first time, wherein the first enrolled primary data represents biometric data;

determining second enrolled primary data based on the first enrolled primary data;

storing the second enrolled primary data; and determining second enrolled secondary data based on the second enrolled primary data.

15. The method of claim 14, further comprising:

determining identification data associated with a first user;

determining input image data of the first user;

wherein the determining the first enrolled primary data is based on a first primary network module, first encoder weight data, and the input image data; and associating the identification data with the first enrolled primary data.

16. The method of claim 14, further comprising:

determining a first set of training data;

determining a second set of training data comprising first primary data of the first set of training data, wherein the second set of training data is based on the first set of training data, a first primary network module, and first encoder weight data;

determining a third set of training data comprising second primary data of the first set of training data, wherein the third set of training data is based on the first set of training data, a second primary network module, and second encoder weight data;

determining translator weight data of a translator module based on the second set of training data and the third set of training data; and wherein the determining the second enrolled primary data is further based on the translator module and the translator weight data.

17. The method of claim 14, further comprising, before the first time:

determining a first set of training data;

determining a second set of training data comprising first primary data of the first set of training data, wherein the second set of training data is based on the first set of training data, a first primary network module, and first encoder weight data;

determining a third set of training data comprising second primary data of the first set of training data, wherein the third set of training data is based on the first set of training data, a second primary network module, and second encoder weight data;

determining translator weight data of a translator module based on the second set of training data and the third set of training data; and wherein the determining the second enrolled primary data is further based on the translator module and the translator weight data.

18. The method of claim 14, further comprising:

determining a first set of training data;

determining a second set of training data comprising first primary data of the first set of training data, wherein the second set of training data is based on the first set of training data, a first primary network module, and first encoder weight data;

determining first embedding weight data based on a first secondary network module and the second set of training data;

determining first enrolled secondary data based on the first enrolled primary data, the first secondary network module, and the first embedding weight data;

determining a third set of training data comprising second primary data of the first set of training data, wherein the third set of training data is based on the first set of training data, a second primary network module, and second encoder weight data;

determining second embedding weight data based on a second secondary network module and the third set of training data; and wherein the determining the second enrolled secondary data is further based on the second secondary network module and the second embedding weight data.

19. The method of claim 14, further comprising:

determining query input image data;

determining query primary data based on the query input image data, a second primary network module, and second encoder weight data;

determining query secondary data based on the query primary data, a second secondary network module, and second embedding weight data; and determining identification data that is associated with the query input image data based on the query secondary data and previously stored enrolled secondary data.

20. The method of claim 14, wherein the determining the first enrolled primary data is deprecated comprises one or more of:

determining the first enrolled primary data has expired, determining unauthorized access to the first enrolled primary data, determining a count of accesses to the first enrolled primary data has exceeded a threshold value, or receiving a message.

* * * * *